(12) United States Patent
Okada

(10) Patent No.: US 7,413,352 B2
(45) Date of Patent: Aug. 19, 2008

(54) OPTICAL MODULE

(75) Inventor: Takeshi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/505,686

(22) Filed: Aug. 16, 2006

(65) Prior Publication Data

US 2007/0047873 A1    Mar. 1, 2007

(30) Foreign Application Priority Data

Aug. 23, 2005    (JP)    ............................ 2005-240566

(51) Int. Cl.
*G02B 6/38*    (2006.01)
(52) U.S. Cl. .............................. 385/74; 385/73; 385/88
(58) Field of Classification Search ................... 385/88, 385/73–74
See application file for complete search history.

(56) References Cited

U.S. PATENT DOCUMENTS 7,158,552 B2 * 1/2007 Buchold et al. .......... 372/38.08
7,248,618 B2 * 7/2007 Volodin et al. ............. 372/102
2006/0072632 A1 * 4/2006 Flanders et al. .............. 372/20
2006/0291772 A1 * 12/2006 Haiml et al. .................. 385/16

FOREIGN PATENT DOCUMENTS

JP    2003-229626    8/2003

* cited by examiner

*Primary Examiner*—Frank G Font
*Assistant Examiner*—Eric Wong
(74) *Attorney, Agent, or Firm*—Fish & Richardson P.C.

(57) ABSTRACT

The inventor found that the lightwave of a semiconductor laser includes, in addition to the laser oscillation lightwave, a weak, continuous noise component having a different wavelength (here, referred to as natural emission lightwave). The inventor also found that in the wavelength division multiplexing communication optical system in which signal lightwaves having a plurality of wavelengths are combined to transmit over a single optical fiber so as to be separated at the other end to receive with a plurality of light-receiving devices, the natural emission lightwave causes crosstalk. A natural emission lightwave-blocking filter that reflects a natural emission lightwave is placed on the optical path between the semiconductor laser and the optical fiber. The natural emission lightwave-blocking filter blocks the natural emission lightwave, preventing the crosstalk.

24 Claims, 16 Drawing Sheets

Example 1

Example 2

Example 3
Slanted

Example 4

Example 5

Attached or
vapor-deposited

Example 6

Attached or
vapor-deposited

Example 7

Example 8

Example 9

Example 10

Example 11

Example 12

Example 13

Attached or vapor-deposited

Example 14

Attached or vapor-deposited

Example 15

Example 16

Example 19

US 7,413,352 B2

OPTICAL MODULE

BACKGROUND OF THE INVENTION

1. Field of the Invention

The present invention relates to the improvement of an optical module to be used in unidirectional or bidirectional communication.

2. Description of the Background Art

In the optical communication, an optical signal is produced by a semiconductor laser (LD) at one node, the optical signal is sent through an optical fiber, and the optical signal is read out by a photodiode (PD) at another node. Transmission and reception of the signal is performed by using two optical fibers in one case and one optical fiber in another case. As the optical source, a semiconductor laser (LD), a light-emitting diode (LED), or the like is used. Here, it is assumed that an LD is used as the light source.

When it is intended to send the largest possible number of signals by using a single optical fiber, the wavelength division multiplexing transmission is employed. Two or more signal lightwaves $\Lambda 1, \Lambda 2, \ldots$ having different wavelengths are produced by different LDs at different nodes. The signal lightwaves are combined to send over a single optical fiber. The transmitted signals are separated at the exit according to the wavelengths. The separated signals are detected by different PDs at different nodes.

As a multiplexer for combining lightwaves having different wavelengths and as a demultiplexer for separating lightwaves having different wavelengths, a WDM (in this specification, the term WDM is used to mean a wavelength multiplexer or demultiplexer) and the like are used. When a signal is sent in one direction, a plurality of transmitting nodes are provided at one end of the optical fiber. The transmitting nodes are denoted as U1, U2, U3, ... Um. At the other end, the same number of receiving nodes are provided. They are denoted as W1, W2, W3, ... Wm. The light sources for all the transmitting nodes are semiconductor lasers LD1, LD2, LD3, ... LDm having different oscillation wavelengths. The different oscillation wavelengths are denoted as $\Lambda 1, \Lambda 2, \Lambda 3, \ldots \Lambda m$. The demultiplexer can completely separate the lightwaves $\Lambda 1, \Lambda 2, \Lambda 3, \ldots \Lambda m$ having different wavelengths. Therefore, it is supposed that no interference occurs between different nodes.

FIG. 19 shows a simplified optical communication system. For simplicity, in this system, m=2 is employed. However, the same phenomenon occurs in a general system in which m=m. The LD1 at the U1 generates a transmission lightwave of $\Lambda A$. The lightwave propagates through an optical fiber 38, a multiplexer (WDM) 39, an optical fiber 40, a demultiplexer (WDM) 42, and an optical fiber 43 to enter a PD1 at the receiving node W1. In this case, however, from the U2, although the magnitude is small, another lightwave of $\Lambda A$ may enter the PD1 at the W1, causing a noise.

Similarly, the receiving node W2 receives the signal lightwave $\Lambda B$ from the U2, together with a small magnitude of the lightwave $\Lambda B$ from the U1. This small magnitude causes a noise. In other words, the W2 receives the signal lightwave from the U2 and a noise form the U1. This example has only two pairs. However, in the case where the system has "m" pairs and they transmit and receive signal lightwaves through a common optical fiber 40, all the nodes may have a possibility of receiving not only a single signal lightwave but also "m−1" noise lightwaves.

In the case where a central office and each of the terminal optical network units (ONUs) are connected with a single optical fiber and the system performs bidirectional communication by sending an analog signal and a digital signal, there also exists a possibility of interference. FIG. 20 shows schematically such a wavelength division multiplexing optical communication system. A central office has a node Ua for transmitting and receiving a digital signal and a node Ub for transmitting an analog signal. The node Ua is provided with a LDa for converting a digital signal into an optical signal of $\Lambda A$ and a PDa for converting an optical signal of $\Lambda c$ into a digital signal. A digital signal from the Ua is sent as an optical signal of $\Lambda A$ and travels through an optical fiber 48, a multiplexer (WDM) 49, and an optical fiber 50 to arrive at a PDc at the terminal Wc. The PDc receives the signal. An LDe at the terminal ONU generates a digital signal having a wavelength of $\Lambda c$. The digital signal is transmitted to the PDa at the Ua in the central office through the optical fiber 50, the multiplexer (WDM) 49, and the optical fiber 48.

If this is only the operation, it is simply a one-to-one bidirectional communication. However, in addition to the above operation, the LDb in the Ub at the central office transmits an analog signal $\Lambda B$ having a wavelength of $\Lambda B$. The analog signal travels through an optical fiber 54, the multiplexer (WDM) 49, and the optical fiber 50 to enter a PDd at the Wc. In such a case, the two lasers LDa and LDb in the central office have different oscillation wavelengths of $\Lambda A$ and $\Lambda B$. This causes interference in the PDc and PDd. Even though the multiplexer (WDM) 49 operates normally, the interference occurs.

The present inventor has studied variously about the cause. Finally, the present inventor has determined the cause of the interference. A semiconductor laser is supposed to generate a stimulated emission lightwave having a single wavelength of $\Lambda$. Actually, however, in addition to that emission, a semiconductor laser also generates a weak lightwave. According to the theory of the lasing, in the case where a population inversion is produced by a current, when a stimulated emission occurs, all the excited electrons are supposed to return to the ground state simultaneously, generating an oscillation at the same phase and the same wavelength. It is explained that when the excitation energy exceeds a threshold value, all the energy is absorbed into a mode having a common phase and wavelength, producing only a lightwave having a single wavelength of $\Lambda$.

The actual fact is different, however. At the time the electrons return to the ground state, a lightwave is emitted that has an energy corresponding to the level difference between the conduction band and the valence band. In this case, the electrons in the conduction band also have kinetic energy, and the holes in the valence band also have kinetic energy. Therefore, even when the electron-hole pairs disappear due to the returning of the electrons from the conduction band to the valence band, a small difference in energy exists from pair to pair. This energy difference may produce a plurality of longitudinal modes. Even when only a single longitudinal mode exists, a lightwave, although weak, is produced that has a wavelength other than $\Lambda$.

In the case of a semiconductor laser, which has a cavity short in length and has a large gain, a lightwave having a wavelength other than the oscillation wavelength $\Lambda$ still exists. So far, the existence of such a lightwave has not even been noticed. The present inventor has found that such a lightwave having a wavelength other than $\Lambda$ is emitted from a semiconductor laser. Here, the thus emitted lightwave is referred to as a "natural emission lightwave."

The term "natural emission lightwave" is slightly different in meaning from the term "spontaneous emission lightwave" used in the laser theory. Originally, a laser is devised as a solid laser or a gas laser. In this case, the excitation level is distinct and the energy difference in the population-inverted level is determined uniquely. There exist no various energy levels. Therefore, the wavelength of the generated lightwave is determined as a single wavelength. Both the spontaneous emission lightwave and the laser oscillation lightwave have the same wavelength. When the spontaneous emission lightwaves become to have a uniform phase, they become to be the laser oscillation lightwaves. In other words, when the phase is uniform, they are the laser oscillation lightwaves. When the phase is randomly distributed, they are the spontaneous emission lightwaves. At least, both the spontaneous emission lightwave and the laser oscillation lightwave have the same wavelength (energy).

In the case of a semiconductor laser, however, the light emission is not produced by the two-level transition of atoms but by the current injection. Consequently, the light emission by the electron-hole pair produces different wavelengths. Here the term "natural emission lightwave" is used to have a wider meaning than the "spontaneous emission lightwave" used in the ordinary laser engineering. The term "natural emission lightwave" has a meaning different from the term "spontaneous emission lightwave" used in the ordinary laser engineering based on the explanation of the gas laser. Here, the emitted lightwaves having different energies (wavelengths), not different phases, are referred to as the "natural emission lightwave $\Sigma n$." To emphasize that the natural emission lightwave includes a large number of wavelengths, the sign $\Sigma$ is used.

FIG. 21 is a wavelength spectrum of a semiconductor laser emitting a lightwave at a wavelength of $\Lambda q$ (for example, 1,490 nm). The horizontal axis represents the wavelength, and the vertical axis the power (dB). The laser oscillation lightwave is used as a reference of 0 dB. A peak of an output having a large power appears at an intended wavelength. However, in addition to that, a continuous spectrum having a weak output exists at both sides of the peak. This phenomenon has so far been overlooked. Not only is the phase different but also the wavelength (energy) is different. Here, the weak lightwave is referred to as the natural emission lightwave $\Sigma n$. In contrast, the lightwave having a specified wavelength emitted by the laser is referred to as the laser oscillation lightwave $\Lambda q$. The natural emission lightwave $\Sigma n$ is as weak as −40 to −50 dB. However, although weak, the natural emission lightwave exists.

Such a natural emission lightwave is likely to cause the interference in FIGS. 19 and 20. In the case of FIG. 19, the transmission member transmits both the signal lightwave $\Lambda B$ from the LD2 and the noise lightwave $\Lambda B$ from the LD1, and they enter the PD2 of the receiving member to be detected. The PD2 receives both the signal lightwave and the natural emission lightwave both having a wavelength of $\Lambda B$. The natural emission lightwave is a noise. In FIG. 19, the PD1 receives both the natural emission lightwave of the LD2 and the laser oscillation lightwave of the LD1. Both the PD1 and PD2 receive the noise having the same wavelength as that of the signal lightwave. Even when the multiplexer (WDM) 39 and the demultiplexer (WDM) 42 operate normally, because the wavelength is the same, such a noise cannot be blocked by the WDM. The present invention intends to solve the problem of the interference due to the natural emission lightwave.

So far, the fact has not been known that a semiconductor laser emits a natural emission lightwave having a different wavelength. Consequently, no literature has noticed the problem of interference that occurs when two or more semiconductor laser lightwaves having different oscillation wavelengths are transmitted through the same optical fiber. The present inventor was unable to find a previously published literature that raised such a problem and showed a step to solve it.

The patent literature 1 describes as follows: The oscillation wavelength of a semiconductor laser deviates from a specified value. To solve the problem, the backward light of the semiconductor laser is observed with a photodiode for monitoring the wavelength. When the wavelength deviates, a control circuit of the semiconductor laser returns the wavelength to the specified value. To prevent the backward light from leaking, the heat sink is extended toward the rear. This is an idea of the patent literature 1. The patent literature 1 notices as a problem the variation in the laser oscillation lightwave itself of a semiconductor laser. Then, the variation in the wavelength of the laser oscillation lightwave is prevented. The patent literature 1 does not mention the existence of a natural emission lightwave in addition to the lightwave having the oscillation wavelength $\Lambda$. It is likely that the patent literature 1 believes that the total energy is concentrated to the lightwave of the oscillation wavelength. In addition, the patent literature 1 does not raise the problem of interference caused by the natural emission lightwave.

Patent literature 1: the published Japanese patent application Tokukai 2003-229626

As described earlier, in a solid laser and the like, the spontaneous emission lightwaves are lightwaves having the same wavelength as that of the laser oscillation lightwave but having nonuniform phases. It is not recognized that in the case of a semiconductor laser, lightwaves having different wavelengths are emitted. In other words, it is not noticed that something like the natural emission lightwave exists that has a continuous spectrum with different wavelengths as described in the present invention. Consequently, no recognition exists to prevent the interference caused by that. In this field, it can be said that the natural emission lightwave itself in a semiconductor laser is a novel discovery. Therefore, no prior art exists to prevent the interference caused by that. The present inventor was unable to find such a prior art.

SUMMARY OF THE INVENTION

The lightwaves emitted by a semiconductor laser include not only the laser oscillation lightwave having a uniquely determined wavelength and phase but also natural emission lightwaves having different wavelengths and different phases. When wavelength division multiplexing optical communication is performed, a natural emission lightwave exists. Consequently, interference occurs between semiconductor lasers that are supposed to emit different wavelengths. This interference cannot be prevented by improving the WDM (multiplexer or demultiplexer). The present invention relates to the improvement of a wavelength division multiplexing optical communication system that uses semiconductor lasers in parallel to emit different laser oscillation lightwaves so that optical signals having different wavelengths can be transmitted over a single optical fiber. An object of the present invention is to offer an optical communication system that is free from interference between different semiconductor lasers and light-receiving devices.

An optical module of the present invention provides a filter between a semiconductor laser and an optical fiber, the filter transmitting only the laser oscillation lightwave included in the lightwave emitted by the semiconductor laser and blocking lightwaves having the other wavelengths. Thus, the lightwave (natural emission lightwave) having a wavelength other than that of the laser oscillation lightwave cannot be introduced into the optical fiber. Here, the filter is simply referred to as a "natural emission lightwave-blocking filter."

The basic form of an optical module of the present invention comprises:
(a) a semiconductor laser that emits a laser oscillation lightwave $\Lambda q$ and a natural emission lightwave $\Sigma n$;
(b) an optical fiber for guiding the lightwave of the semiconductor laser;
(c) a lens for condensing the lightwave of the semiconductor laser at the optical fiber; and
(d) a natural emission lightwave-blocking filter, NF, that:
(d1) is placed between the semiconductor laser and the optical fiber; and
(d2) transmits the laser oscillation lightwave $\Lambda q$ of the semiconductor laser and blocks the natural emission lightwave $\Sigma n$.

Because the object is to attenuate the crosstalk, a plurality of such basic units are provided to introduce signal lightwaves into the same optical fiber. The system is more generally expressed as shown below.

An optical module of the present invention is formed by the congregation of "m" pieces of basic forms. The general form of the optical module comprises:
(a) "m" pieces of semiconductor lasers LDj (j=1, 2, ..., m) for emitting laser oscillation lightwaves $\Lambda qj$ and natural emission lightwaves $\Sigma nj$,
(b) "m" lengths of branching optical fibers Fj (j=1, 2, ..., m) for introducing the lightwaves of the semiconductor lasers LDj,
(c) a single optical fiber F0 for collectively transmitting the signal lightwaves from the "m" lengths of branching optical fibers Fj,
(d) lenses Lj (j=1, 2, ..., m) for condensing the lightwaves from the semiconductor lasers LDj at the optical fibers Fj, and
(e) natural emission lightwave-blocking filters NFj (j=1, 2, ..., m) that are provided between the semiconductor lasers LDj and the optical fibers Fj and that transmit the laser oscillation lightwaves $\Lambda qj$ of the semiconductor lasers LDj and block the natural emission lightwaves $\Sigma nj$, which have wavelengths in the vicinity of the $\Lambda qi$ (i≠j), which are other than the $\Lambda qj$.

The above description can be written formally as follows:
LD1+L1+NF1+F1
LD2+L2+NF2+F2
...
LDj+Lj+NFj+Fj
...
LDm+Lm+NFm+Fm+F0.

The signals are collected in a single optical fiber by the multiplexing device as written in the form of F1+F2+ ... +Fm→F0. At the receiving site, the signals are separated by the demultiplexing device (WDM) according to their wavelengths. This process is written as follows: F0→F1+F2+F3+ ... +Fm. The separated signals are distributed to optical systems of "m" pieces of different light-receiving devices.
F0+F1+L1+PD1
F2+L2+PD2
...
Fj+Lj+PDj
...
Fm+Lm+PDm.

As described above, the system includes a plurality of transmitting LDs. Therefore, the system has a possibility of crosstalking. Here, an idea is described to improve an optical system composed of "LDj+Lj+NFj+Fj" as an example. The remaining optical systems can be treated similarly.

The natural emission lightwave-blocking filter is inserted between the semiconductor laser and the optical fiber. In this case, the lightwave of the semiconductor laser is condensed by the lens to introduce into the end face of the optical fiber. Consequently, the natural emission lightwave-blocking filter and the lens are arranged in series. In this arrangement, either of the two may be placed closer to the semiconductor laser. In addition, an isolator is sometimes used to prevent an external feedback of the laser lightwave. In this case, three components (i.e., lens, isolator, and natural emission lightwave-blocking filter) are placed between the semiconductor laser and the end face of the optical fiber. The order of the placement of the three components has no limitation, although six different combinations can be conceived. Furthermore, the natural emission lightwave-blocking filter is made of a thin dielectric multilayer film. Consequently, it may be attached or vapor-deposited on the end face of the semiconductor laser. In contrast, the natural emission lightwave-blocking filter may be attached or vapor-deposited on the end face of the optical fiber. Yet alternatively, the natural emission lightwave-blocking filter may be attached or vapor-deposited on a face of the lens or on a face of the isolator.

FIG. 22 shows the most ideal transmittance spectrum of the natural emission lightwave-blocking filter. In this spectrum, only the signal lightwave's wavelength $\Lambda q$ has a window of a 100% transmittance, and the other wavelengths $\Sigma n$ have a transmittance of 0%. The width $\Delta \Lambda$ of the window is 10 to 100 nm, which is determined according to the purpose. The natural emission lightwave-blocking filter can be produced by putting a number of thin dielectric films in layers. In this case, two types of dielectric films having different refractive indexes are used. However, the filter having a sharp step property as shown in FIG. 22 is high in production cost because it requires to use a large number of layers.

When a wavelength division multiplexing optical system has only two wavelengths $\Lambda A$ and $\Lambda B$, the design of the natural emission lightwave-blocking filter can be further simplified. The natural emission lightwave-blocking filter to be placed right behind the semiconductor laser LDb for emitting the lightwave of $\Lambda B$ needs only to have a property as shown in FIG. 24. More specifically, the transmittance is high in a finite wavelength range including $\Lambda B$ and close to zero at the wavelength $\Lambda A$. In other words, the filter may have a convex transmittance distribution, in which the transmittance decreases gradually at some intermediate range between the two wavelengths. The filter is not required to block all of the natural emission lightwave of the semiconductor laser LDa. It is only required to block a natural emission lightwave having a wavelength in the vicinity of the wavelength of the lightwave of the other LD. The PDa does not receive the lightwave having the other wavelength. Therefore, it is sufficient to remove only the $\Lambda B$ of the LDb.

When only two wavelengths $\Lambda A$ and $\Lambda B$ are used, the filter may have a more simplified transmittance distribution as shown in FIG. 25. In this filter, the transmittance is close to 100% at the $\Lambda B$, is close to 0% at the $\Lambda A$, and gradually varies form 100% to 0% at some intermediate range between the two wavelengths. At wavelengths longer than the $\Lambda A$, the transmittance has a considerable magnitude. Nevertheless, even when the natural emission lightwave leaks at these ranges, no problem is caused. It is essential only that the $\Lambda A$ does not enter the PDc.

If the relationship in magnitude between the wavelengths ΛA and ΛB is reversed, a filter having a transmittance distribution as shown in FIG. 26 may be placed right behind the semiconductor laser LDa.

As described above, a natural emission lightwave-blocking filter is required only to remove the natural emission lightwave having the wavelength of the other member. Consequently, as shown in FIGS. 24 to 26, a filter may have a gradual transmittance distribution. Such a filter can be produced with an intended performance by using a dielectric multilayer film having a small number of layers.

According to the present invention, the natural emission lightwave-blocking filter removes the natural emission lightwave included in the lightwave emitted from a semiconductor laser before the signal lightwave is introduced into the optical fiber. In an optical system in which a plurality of semiconductor laser signals having different wavelengths are transmitted over a single optical fiber, the present invention can suppress the crosstalk between the different signal systems.

EXPLANATION OF THE SIGN

4: wavelength-selecting filter; 5: LD; 6: lens; 7: optical fiber; 8: natural emission lightwave-blocking filter; 9: isolator; 25: PD; 26: lens; 28: noise wavelength-blocking filter; 29: lens; 38: optical fiber; 39: multiplexer; 40: optical fiber; 42: demultiplexer; 43: optical fiber; 44: optical fiber; 45: optical fiber; .48: optical fiber; 49: multiplexer; 50: optical fiber; 54: optical fiber; 64: wavelength-selecting filter; 65: PD; 66: lens; 68: noise wavelength-blocking filter; Λq: laser oscillation lightwave; Σn: natural emission lightwave; ΛA: wavelength of laser oscillation lightwave of LDa and LD1; ΛB: wavelength of laser oscillation lightwave of LDb and LD2; LDa, LDb, and LDe: semiconductor laser; PDa, PDc, PDd, PD1, and PD2: photodiode.

DETAILED DESCRIPTION OF THE INVENTION

Figure 19:
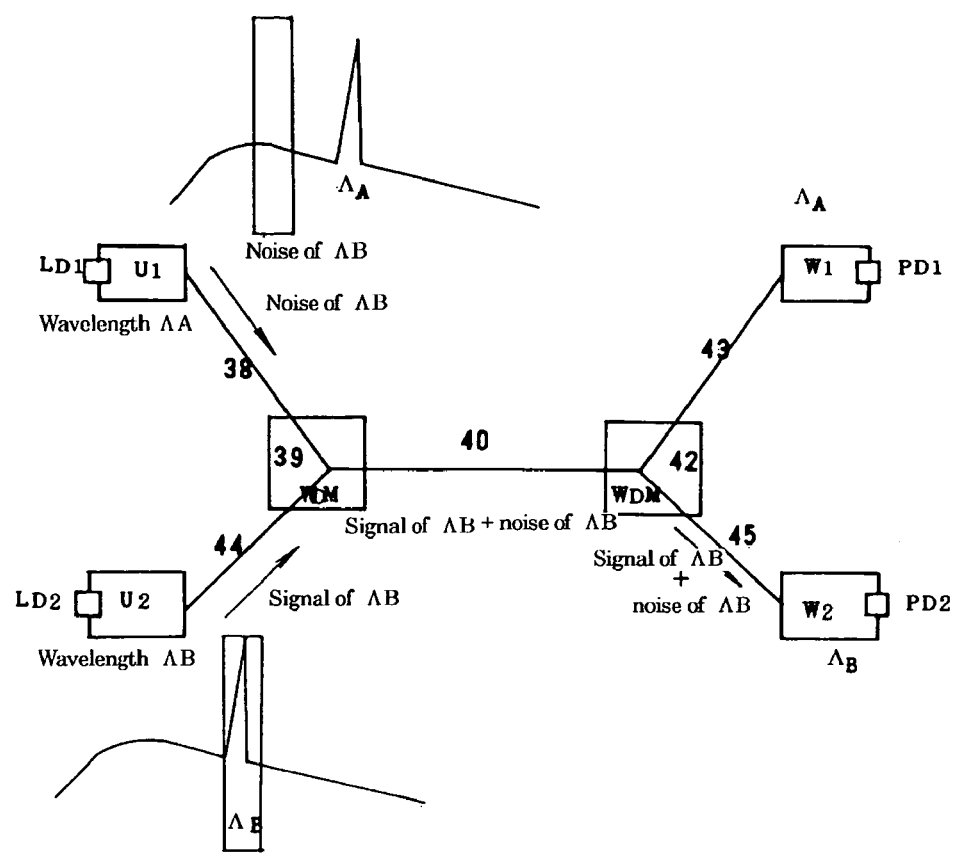
FIG. 19 is an optical system-constituting diagram explaining the occurrence of a crosstalk in a wavelength division multiplexing optical communication system, in which the transmitting site has two semiconductor lasers LD1 and LD2 and the receiving site has two light-receiving devices PD1 and PD2, the cause of the crosstalk being that a noise of ΛB from the LD1 and a signal lightwave of ΛB from the LD2 enter the PD2 of the receiving site.
Figure 27:
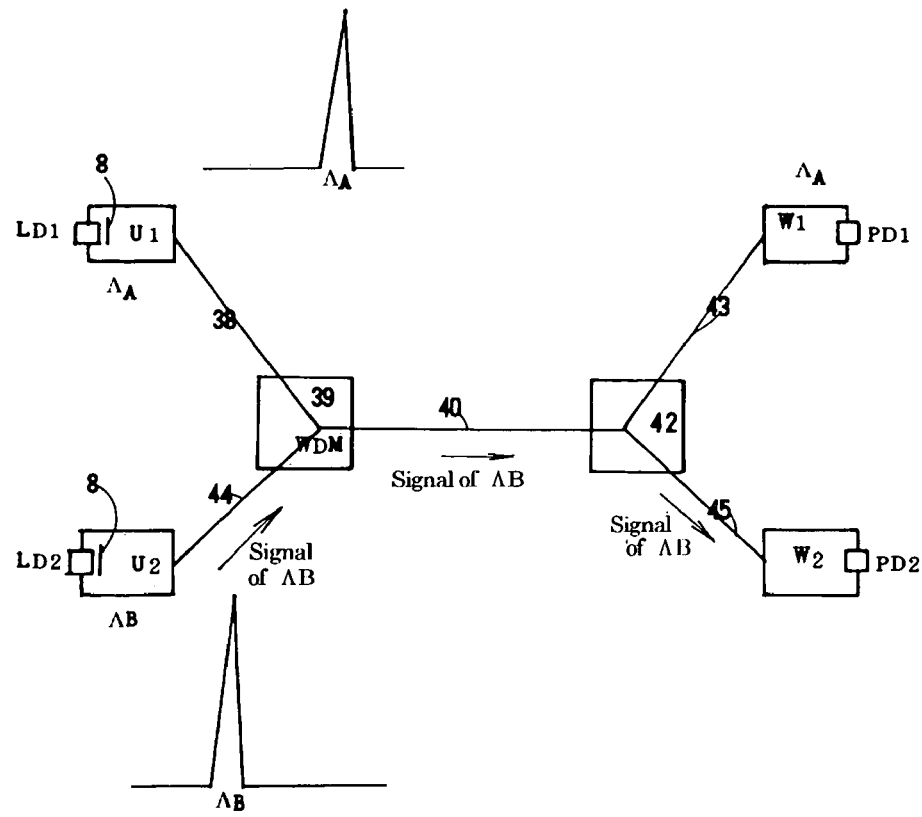
FIG. 27 is an optical system-constituting diagram showing an example of the present invention in which in the optical system shown in FIG. 19, the crosstalk is eliminated by placing a natural emission lightwave-blocking filter in front of the semiconductor laser.

For example, FIG. 19 shows an optical system in which two semiconductor lasers LD1 and LD2 emit signal lightwaves having wavelengths of ΛA and Λ B, respectively, the signal lightwaves are combined with a multiplexer (WDM) 39 to transmit over the same optical fiber 40, the combined signal lightwaves are separated with a demultiplexer (WDM) 42, and the separated signal lightwaves of ΛA and ΛB are received with two light-receiving devices PD1 and PD2, respectively. In this optical system, right behind the LD1, a natural emission lightwave-blocking filter 8 is provided that blocks the natural emission lightwave having a wavelength other than the wavelength ΛA. FIG. 27 shows an optical system improved by the present invention as described above. Right behind the LD1, a natural emission lightwave-blocking filter 8 is provided that blocks the natural emission lightwave having a wavelength other than the wavelength ΛA, and, similarly, right behind the LD2, another natural emission lightwave-blocking filter 8 is provided that blocks the natural emission lightwave having a wavelength other than the wavelength ΛB. This system eliminates the ΛB noise from the LD1. The PD2 at the receiving site receives only the signal lightwave of ΛB from the LD2. The ΛB noise from the LD1 does not intrude, so that the crosstalk is eliminated.

Figure 20:
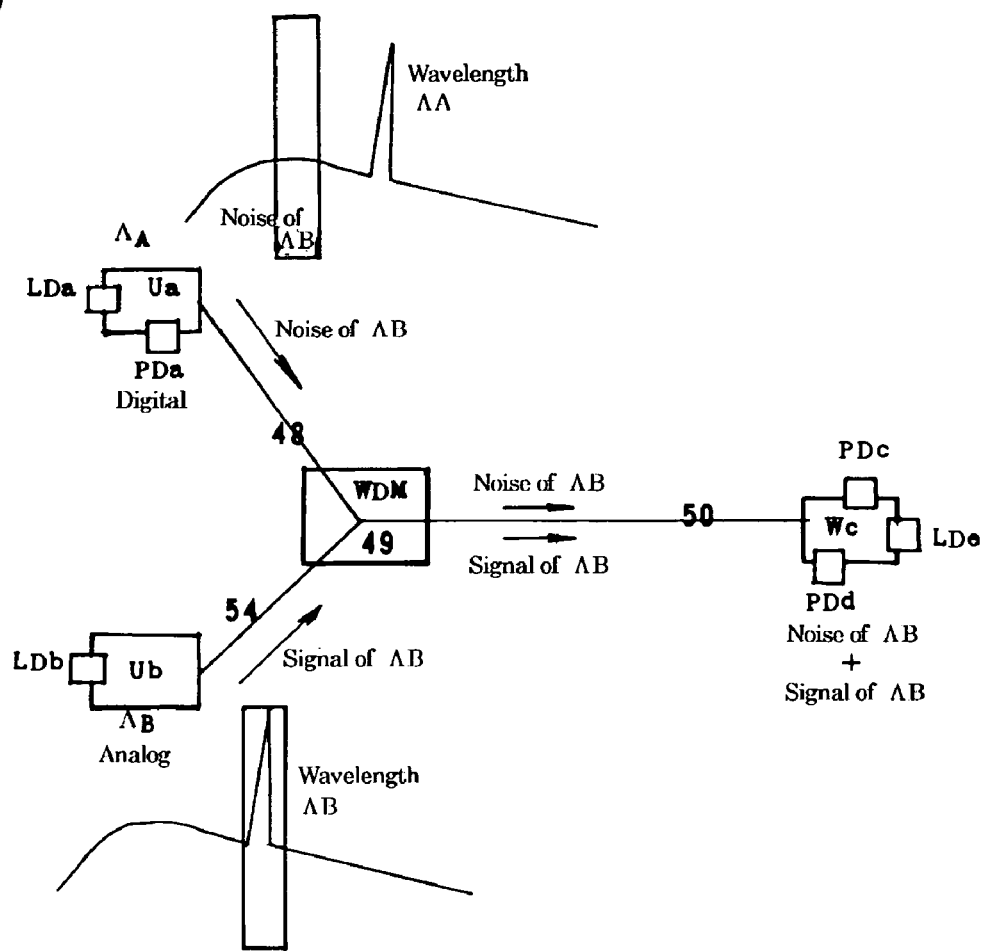
FIG. 20 is an optical system-constituting diagram explaining the occurrence of a crosstalk in an optical communication system, in which a node having a semiconductor laser LDa and a PDa and another node having a semiconductor laser LDb are connected to a node having two light-receiving devices PDc and PDd and a semiconductor laser LDe through a single optical fiber, the cause of the crosstalk being that a noise of ΛB from the LDa and a signal lightwave of ΛB from the LDb enter the PDd of the receiving site.
Figure 21:
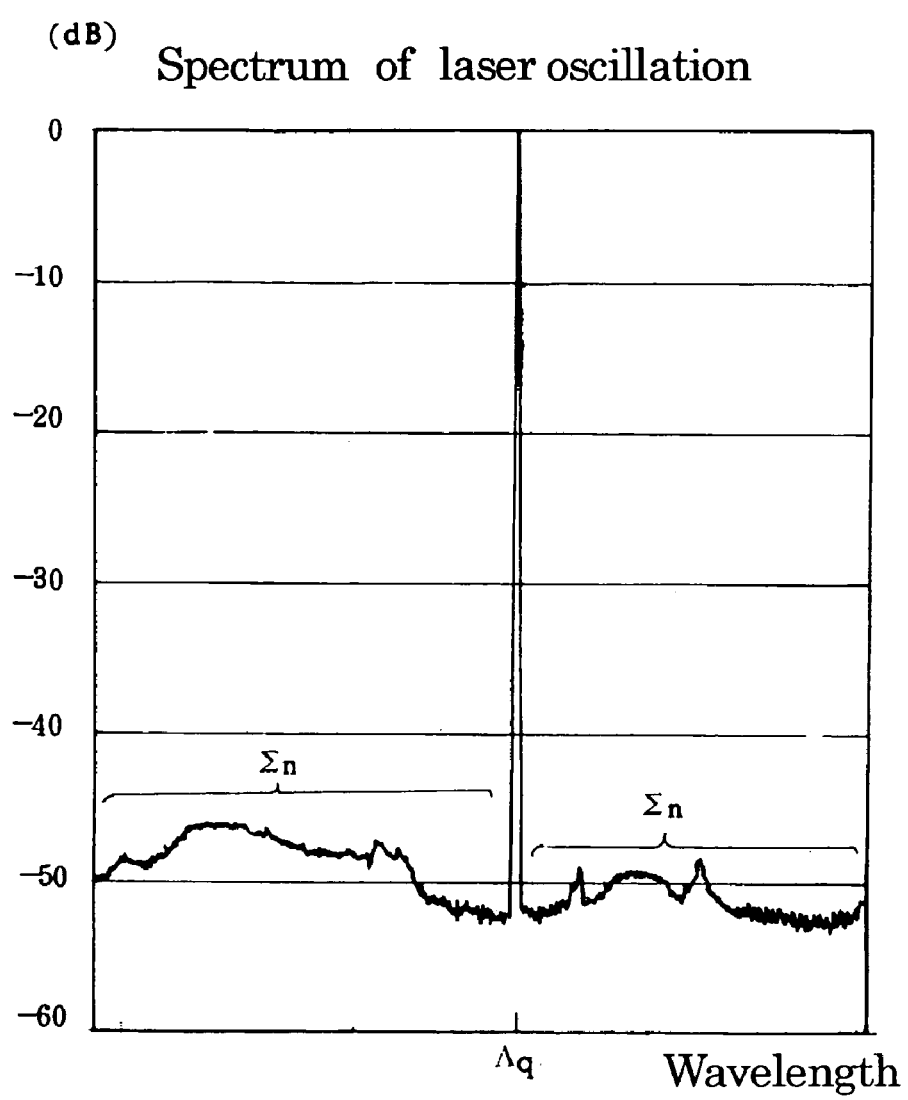
FIG. 21 is an oscillation spectrum of a semiconductor laser, in which weak lightwaves having different wavelengths are included in addition to the laser oscillation lightwave, the weak lightwaves being noise lightwaves whose level is fluctuated (here, they are referred to as natural emission lightwave Σn).
Figure 22:
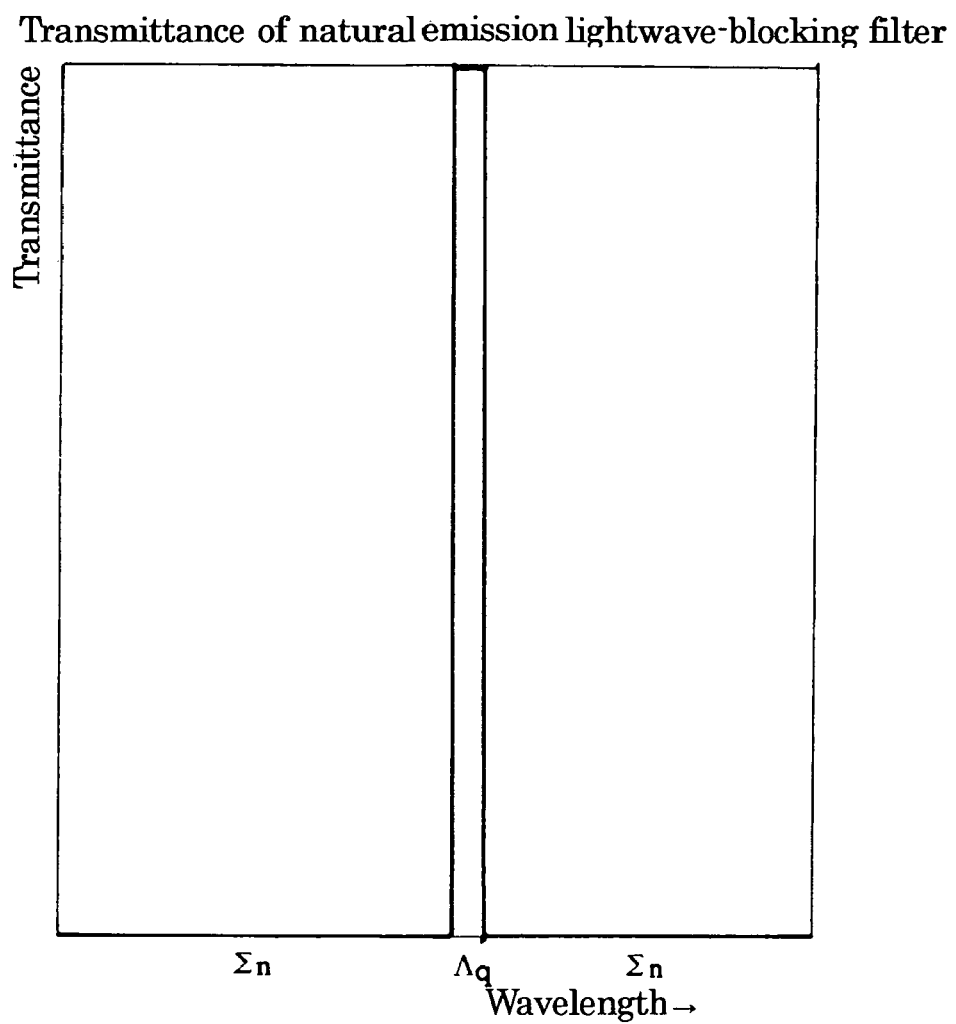
FIG. 22 is a chart showing the transmittance-wavelength property of a natural emission lightwave-blocking filter having a step-type transmittance variation in which strictly only the laser oscillation lightwave is transmitted and the natural emission lightwave at both sides of the laser oscillation lightwave is reflected.
Figure 28:
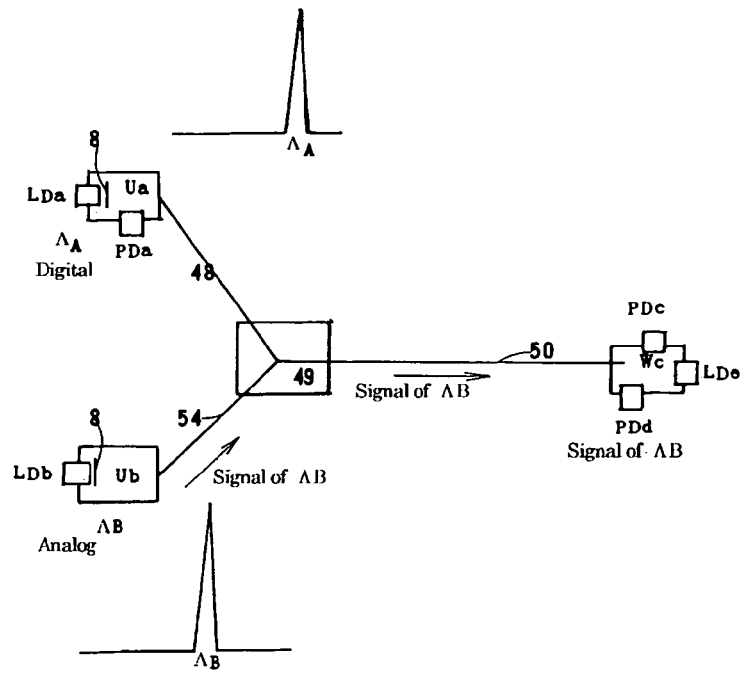
FIG. 28 is an optical system-constituting diagram showing another example of the present invention in which in the optical system shown in FIG. 20, the crosstalk is eliminated by placing a natural emission lightwave-blocking filter in front of the semiconductor laser.

As another example, FIG. 20 shows an optical system in which two semiconductor lasers LDa and LDb emit signal lightwaves having wavelengths of ΛA and ΛB, respectively, the signal lightwaves are combined with a multiplexer (WDM) 49 to transmit over the same optical fiber 50, the combined signal lightwaves are separated with a demultiplexer at a subscriber Wc, and the separated signal lightwaves of ΛA and ΛB are received with two light-receiving devices PDc and PDd, respectively. In this optical system, right behind the LDa, a natural emission lightwave-blocking filter 8 is provided that blocks the natural emission lightwave having a wavelength other than the wavelength ΛA. In addition, right behind the LDb, another natural emission lightwave-blocking filter 8 is provided that blocks the natural emission lightwave having a wavelength other than the wavelength ΛB. FIG. 28 shows an improved optical system as described above. This system eliminates the ΛB noise from the LDa. The PDd at the receiving site receives only the signal lightwave of ΛB from the LDb. The ΛB noise from the LDa does not intrude, so that the crosstalk is eliminated.

The crosstalk can be effectively prevented by providing a natural emission lightwave-blocking filter right behind the individual semiconductor laser not only in the case where two signal lightwaves having different wavelengths from two semiconductor lasers are transmitted over a single optical fiber as described above but also in the case of a wavelength division multiplexing system where three or more signal lightwaves ΛA, ΛB, ΛC, . . . having different wavelengths from three or more semiconductor lasers LDa, LDb, LDc, . . . are transmitted over the same optical fiber to separate at the opposite side with a demultiplexer (WDM) so that individual lightwaves are received by PDa, PDb, PDc, . . . .

Next, an example of the design of a natural emission lightwave-blocking filter is shown below for $\Lambda q=1,490$ nm. The filter is designed to reflect all natural emission lightwaves having a wavelength other than Λ q. Consequently, it has a large number of layers. As the substrate, BK7 glass is used. A reflection-preventing film is formed on one side of the substrate, and a natural emission lightwave-blocking filter is formed on the other side.

As the transparent dielectric material, a combination of SiO2 and Nb2O5 is used. The material is not limited to them. Other materials such as SiON, AlN, TiO2, Al2O3, and Si may be used.

The reflection-preventing film made of Nb2O5 and SiO2 is formed on one side of the BK7 glass substrate, and 40 combinations of a combined layer of Nb2O5 and SiO2 are laminated on the other side. Thus, the natural emission lightwave-blocking filter is formed.

Figure 23:
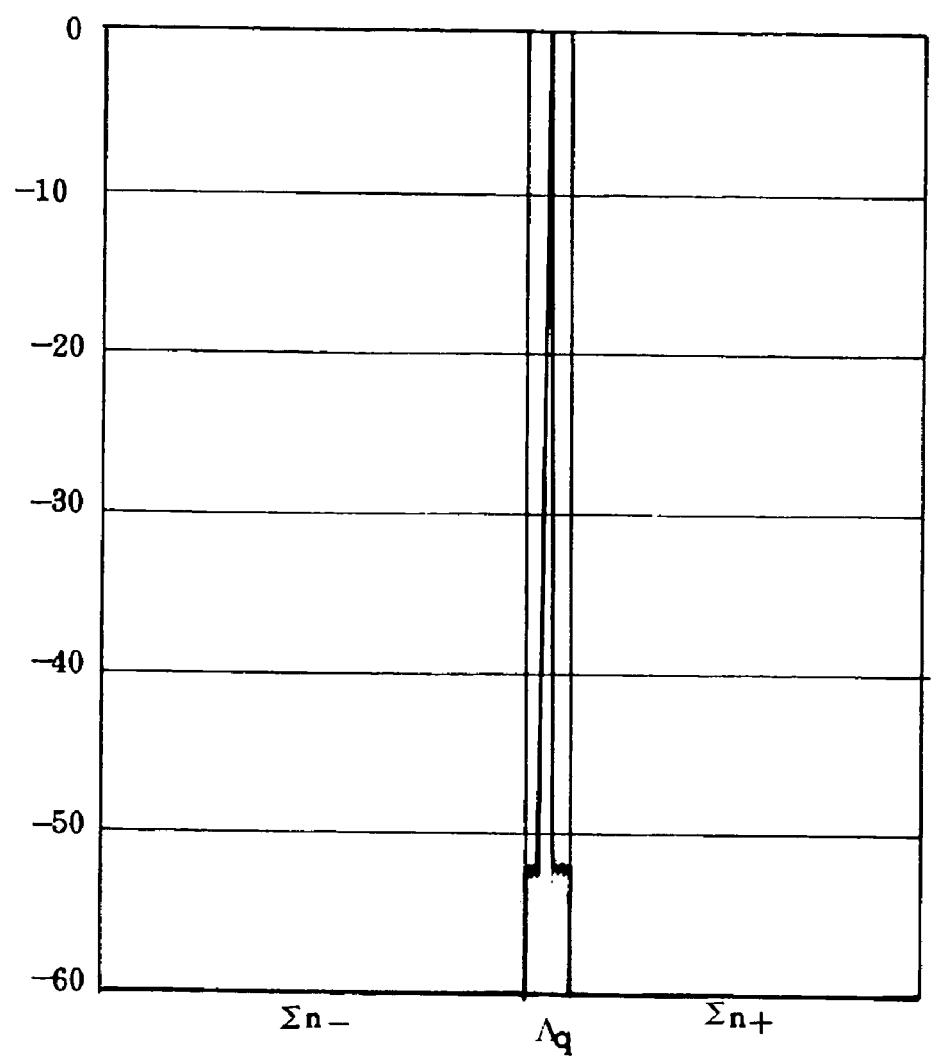
FIG. 23 is a chart showing a spectrum of a transmitted lightwave when a natural emission lightwave-blocking filter producing a step-type variation between a laser oscillation lightwave and a natural emission lightwave is placed in front of the semiconductor laser.
Figure 24:
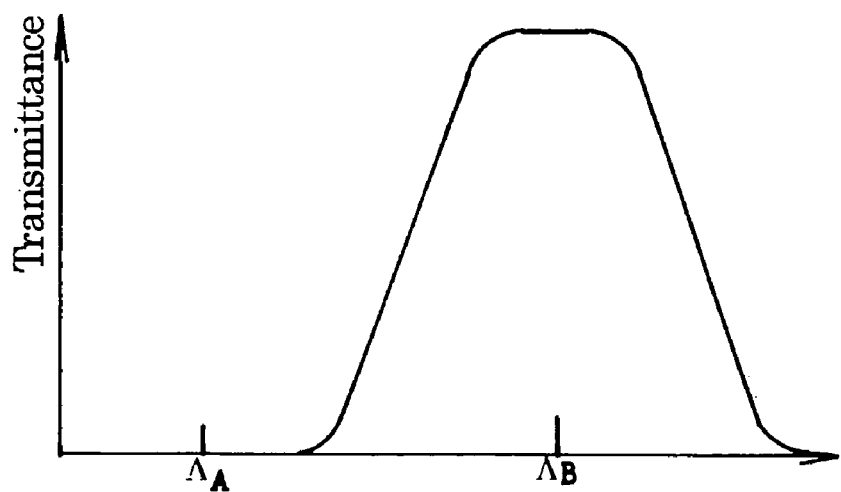
FIG. 24 is a transmittance distribution graph of a natural emission lightwave-blocking filter that has a transmittance of 100% at the oscillation wavelength ΛB of one of the two lasers and that has a transmittance of 0% at the oscillation wavelength ΛA of the other laser and at wavelengths longer than ΛB, with the transmittance varying gradually at some intermediate range between the two wavelengths.
Figure 25:
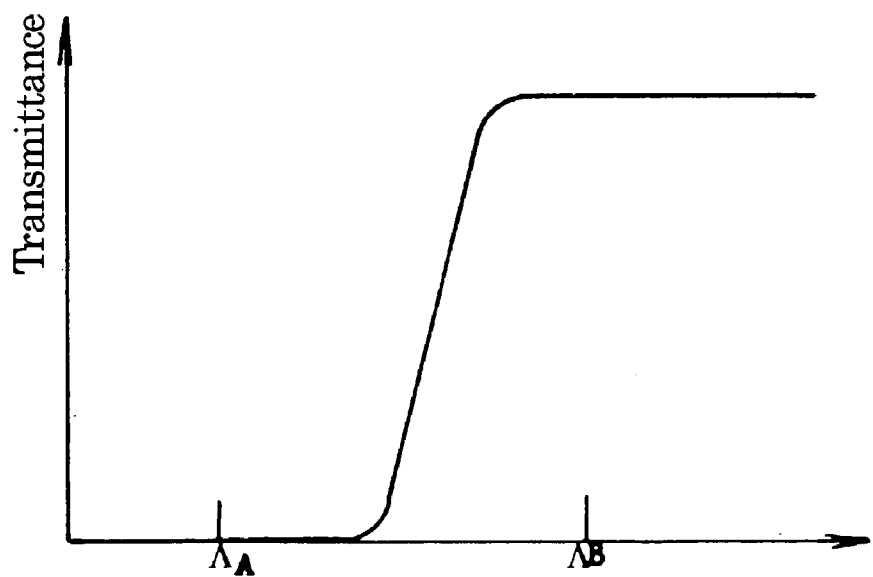
FIG. 25 is a transmittance distribution graph of a natural emission lightwave-blocking filter that has a transmittance of 100% at the oscillation wavelength ΛB of one of the two lasers and that has a transmittance of 0% at the oscillation wavelength ΛA of the other laser, with the transmittance varying gradually at some intermediate range between the two wavelengths.
Figure 26:
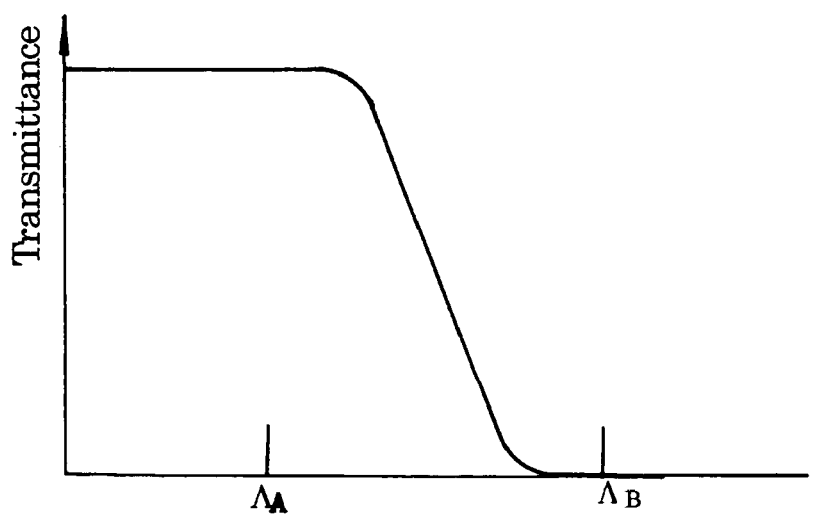
FIG. 26 is a transmittance distribution graph of a natural emission lightwave-blocking filter that has a transmittance of 100% at the oscillation wavelength ΛA of one of the two lasers and that has a transmittance of 0% at the oscillation wavelength ΛB of the other laser, with the transmittance varying gradually at some intermediate range between the two wavelengths.

This is an example of a natural emission lightwave-blocking filter showing an ideal property. It is an excellent natural emission lightwave-blocking filter having a step property as shown in FIG. 23. Therefore, it has a large number of layers. However, the filter as shown in FIGS. 24 to 26 can decrease the number of layers to a large extent.

Next, Examples are explained below in which the position of the natural emission lightwave-blocking filter is changed variously in a system comprising a semiconductor laser, a lens, and an optical fiber (the system further comprises an isolator in some cases).

EXAMPLE 1

Figure 1:
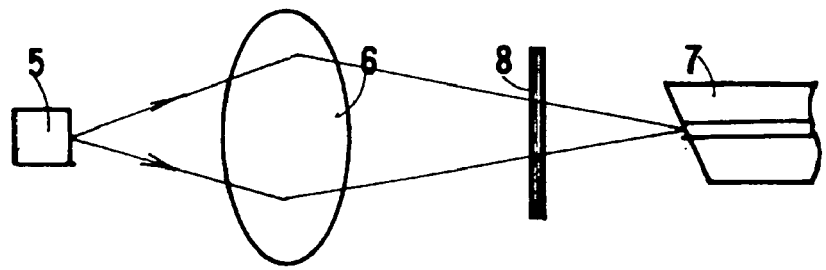
FIG. 1 is an optical system-constituting diagram of an optical module in Example 1 in which optical components are placed in series in the order of a semiconductor laser, a lens, a natural emission lightwave-blocking filter, and an optical fiber.

FIG. 1: LD+Lens+Filter+Optical Fiber

FIG. 1 shows Example 1. A lens 6 and an optical fiber 7 are placed on the light-outgoing-side optical axis of a semiconductor laser (LD) 5. Between the lens 6 and the optical fiber 7, a natural emission lightwave-blocking filter 8 is placed that blocks a natural emission lightwave of the semiconductor laser (LD) 5. The lightwave of the semiconductor laser (LD) 5 is condensed by the lens 6 to be focused on the end face of the optical fiber. The semiconductor laser (LD) 5 generates not only a laser oscillation lightwave having an intended wavelength of Λq but also a natural emission lightwave Σn having different wavelengths. Nevertheless, the natural emission lightwave-blocking filter 8 blocks the natural emission lightwave Σn, transmitting only the laser oscillation lightwave Λq. As a result, only the laser oscillation lightwave Λq enters the optical fiber 7. When the natural emission lightwave-blocking filter is placed between the lens and the optical fiber, the light beam enters the filter at a slight angle with respect to the optical axis, stabilizing the filter property.

EXAMPLE 2

Figure 2:
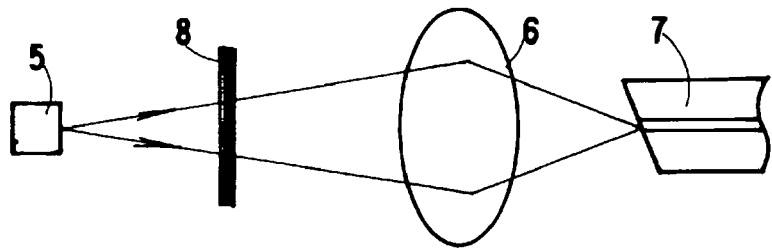
FIG. 2 is an optical system-constituting diagram of an optical module in Example 2 in which optical components are placed in series in the order of a semiconductor laser, a natural emission lightwave-blocking filter, a lens, and an optical fiber.

FIG. 2: LD+Filter+Lens+Optical Fiber

FIG. 2 shows Example 2. A lens 6 and an optical fiber 7 are placed on the light-outgoing-side optical axis of a semiconductor laser (LD) 5. Between the semiconductor laser (LD) 5 and the lens 6, a natural emission lightwave-blocking filter 8 is placed that blocks a natural emission lightwave of the semiconductor laser (LD) 5. The semiconductor laser (LD) 5 generates not only a laser oscillation lightwave having an intended wavelength of Λq but also a natural emission lightwave Σn having different wavelengths. Nevertheless, the natural emission lightwave-blocking filter 8 blocks the natural emission lightwave Σn, transmitting only the laser oscillation lightwave Λq. As a result, only the laser oscillation lightwave enters the optical fiber 7. When the natural emission lightwave-blocking filter is placed between the LD and the lens, they can be hermetically sealed as a unitary body, enabling the miniaturization of the module.

EXAMPLE 3

Figure 3:
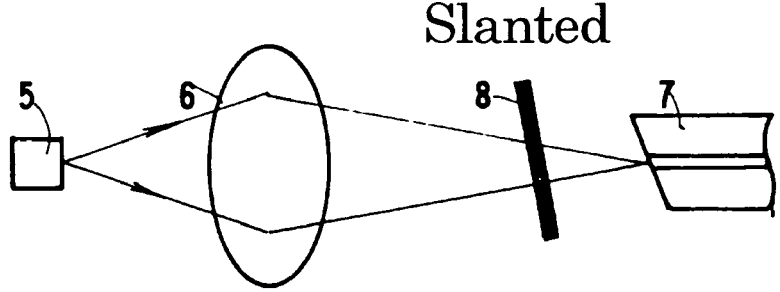
FIG. 3 is an optical system-constituting diagram of an optical module in Example 3 in which optical components are placed in series in the order of a semiconductor laser, a lens, a slanted natural emission lightwave-blocking filter, and an optical fiber.

FIG. 3: LD+Lens+Filter+Optical Fiber

FIG. 3 shows Example 3. A lens 6, a natural emission lightwave-blocking filter 8, and an optical fiber 7 are placed in this order on the light-outgoing-side optical axis of a semiconductor laser (LD) 5. The filter 8 is slanted in order to eliminate the feedback lightwave to the semiconductor laser due to the reflection from the filter 8. The natural emission lightwave-blocking filter 8 blocks the natural emission lightwave Σn included in the lightwave of the semiconductor laser (LD) 5, introducing only the laser oscillation lightwave Λq into the optical fiber 7.

EXAMPLE 4

Figure 4:
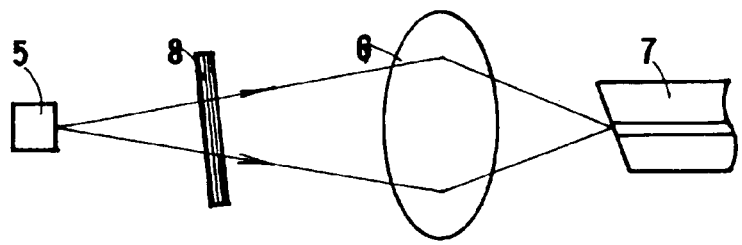
FIG. 4 is an optical system-constituting diagram of an optical module in Example 4 in which optical components are placed in series in the order of a semiconductor laser, a slanted natural emission lightwave-blocking filter, a lens, and an optical fiber.

FIG. 4: LD+Filter+Lens+Optical Fiber

FIG. 4 shows Example 4. A natural emission lightwave-blocking filter 8, a lens 6, and an optical fiber 7 are placed in this order on the light-outgoing-side optical axis of a semiconductor laser (LD) 5. The filter 8 is slanted in order to eliminate the feedback lightwave to the semiconductor laser due to the reflection from the filter 8. The natural emission lightwave-blocking filter 8 blocks the natural emission lightwave Σn included in the lightwave of the semiconductor laser (LD) 5, introducing only the laser oscillation lightwave Λq into the optical fiber 7.

EXAMPLE 5

Figure 5:
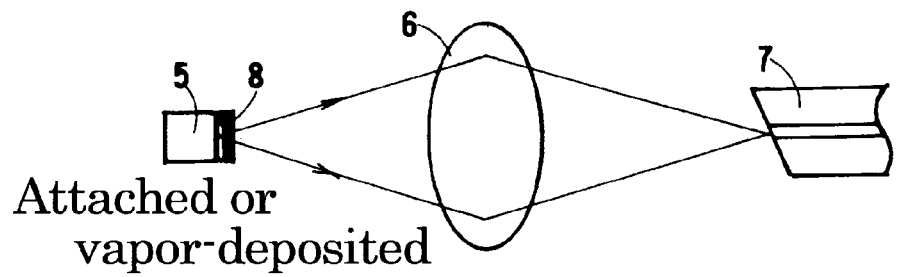
FIG. 5 is an optical system-constituting diagram of an optical module in Example 5 in which optical components are placed in series in the order of a semiconductor laser having a natural emission lightwave-blocking filter formed on its light-outgoing face, a lens, and an optical fiber.

FIG. 5: LD with Filter+Lens+Optical Fiber

FIG. 5 shows Example 5. A lens 6 and an optical fiber 7 are placed in this order on the light-outgoing-side optical axis of a semiconductor laser (LD) 5. This arrangement is the same as before. However, in this example, a natural emission lightwave-blocking filter 8 is attached to the light-outgoing face of the semiconductor laser (LD) 5. The filter 8 is made of a dielectric multilayer film. Consequently, its area has no limitation. In this case, a filter having a small area is bonded to the light-outgoing face of the LD 5. This arrangement can omit the jig for attaching the natural emission lightwave-blocking filter 8 to a holder or the like. The function of the filter is the same as before. The natural emission lightwave-blocking filter 8 blocks the natural emission lightwave $\Sigma n$ included in the lightwave of the LD 5, introducing only the laser oscillation lightwave $\Lambda q$ into the optical fiber 7.

EXAMPLE 6

Figure 6:
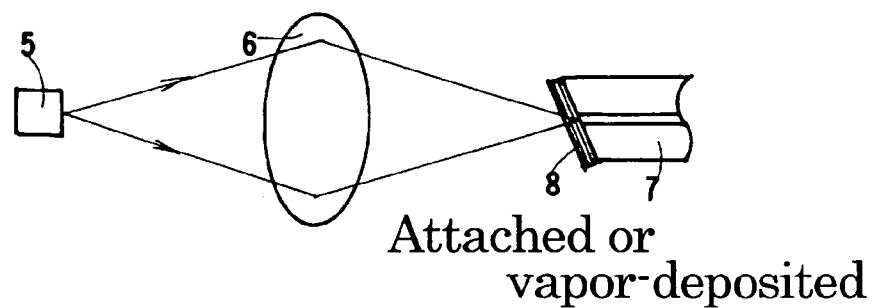
FIG. 6 is an optical system-constituting diagram of an optical module in Example 6 in which optical components are placed in series in the order of a semiconductor laser, a lens, and an optical fiber having a natural emission lightwave-blocking filter formed on its light-incoming end face.

FIG. 6: LD+Lens+Optical Fiber with Filter

FIG. 6 shows Example 6. A semiconductor laser (LD) 5, a lens 6, and an optical fiber 7 are placed linearly in this order. A natural emission lightwave-blocking filter 8 is attached to the light-incoming face of the optical fiber 7. The filter needs only to be placed between the optical fiber 7 and the LD 5. Therefore, even when the filter is attached to the optical fiber 7, the effect is the same. When the natural emission lightwave-blocking filter 8 is directly attached to the optical fiber, a jig for attaching the filter to a holder or the like can be omitted. The function of the filter is the same as before. The natural emission lightwave-blocking filter 8 blocks the natural emission lightwave $\Sigma n$ included in the lightwave of the LD 5, introducing only the laser oscillation lightwave $\Lambda q$ into the optical fiber 7. Because the filter is slanted, the feedback lightwave to the semiconductor laser due to the reflection from the filter is eliminated.

EXAMPLE 7

Figure 7:
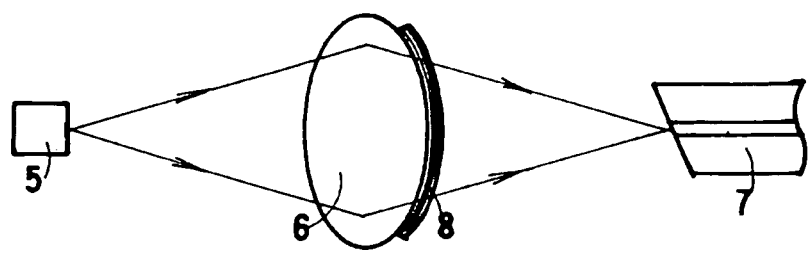
FIG. 7 is an optical system-constituting diagram of an optical module in Example 7 in which optical components are placed in series in the order of a semiconductor laser, a lens having a natural emission lightwave-blocking filter formed on its light-outgoing face, and an optical fiber.

FIG. 7: LD+Lens with Filter+Optical Fiber

FIG. 7 shows Example 7. A semiconductor laser (LD) 5, a lens 6, and an optical fiber 7 are placed linearly in this order. A natural emission lightwave-blocking filter 8 is attached to the light-outgoing-side face of the lens 6. In this case, the filter has a curved face, not a planar face. Nevertheless, the function of the filter remains the same; i.e., the filter blocks the natural emission lightwave and transmits only the laser oscillation lightwave. The filter needs only to be placed between the optical fiber 7 and the LD 5. Therefore, even when the filter is attached to the lens 6, the effect is the same. When the natural emission lightwave-blocking filter 8 is directly attached to the lens 6, a jig for attaching the filter to a holder or the like can be omitted. The function of the filter is the same as before. The natural emission lightwave-blocking filter 8 blocks the natural emission lightwave $\Sigma n$ included in the lightwave of the LD 5, introducing only the laser oscillation lightwave $\Lambda q$ into the optical fiber 7.

EXAMPLE 8

Figure 8:
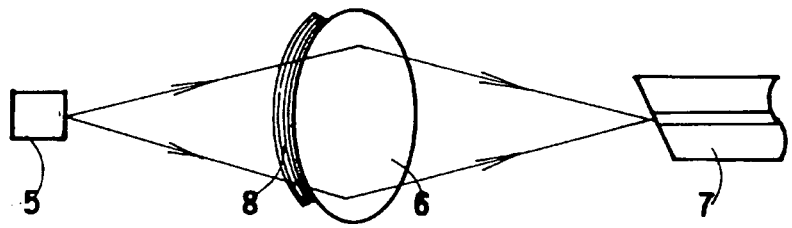
FIG. 8 is an optical system-constituting diagram of an optical module in Example 8 in which optical components are placed in series in the order of a semiconductor laser, a lens having a natural emission lightwave-blocking filter formed on its light-incoming face, and an optical fiber.

FIG. 8: LD+Lens with Filter+Optical Fiber

FIG. 8 shows Example 8. A semiconductor laser (LD) 5, a lens 6, and an optical fiber 7 are placed linearly in this order. A natural emission lightwave-blocking filter 8 is attached to the light-incoming-side face of the lens 6. The function of the filter is the same as before. The natural emission lightwave-blocking filter 8 blocks the natural emission lightwave $\Sigma n$ included in the lightwave of the LD 5, introducing only the laser oscillation lightwave $\Lambda q$ into the optical fiber 7. When the natural emission lightwave-blocking filter 8 is directly attached to the lens 6, a jig for attaching the filter to a holder or the like can be omitted.

EXAMPLE 9

Figure 9:
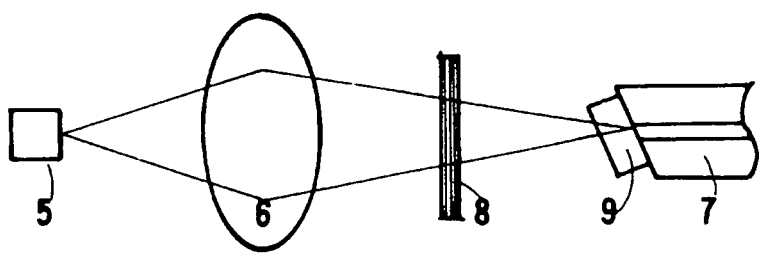
FIG. 9 is an optical system-constituting diagram of an optical module in Example 9 in which optical components are placed in series in the order of a semiconductor laser, a lens, a natural emission lightwave-blocking filter, and an optical fiber having an isolator attached to its end face.

FIG. 9: LD+Lens+Filter+Isolator+Optical Fiber

FIG. 9 shows Example 9. The present invention can also be applied to an optical system in which an isolator is added to any of the optical systems described previously. The application to an optical system having an isolator is explained below. A semiconductor laser (LD) 5, a lens 6, a natural emission lightwave-blocking filter 8, and an optical fiber 7 are placed linearly in this order. An isolator 9 is attached to the light-incoming face of the optical fiber 7. When the lightwave of the LD 5 enters the optical fiber, it returns after being reflected from the other end of the optical fiber. The isolator 9 is provided to prevent the returning lightwave from going back to the LD. The natural emission lightwave-blocking filter 8 is placed between the lens 6 and the optical fiber 7 to block the natural emission lightwave $\Sigma n$ included in the lightwave of the LD 5, introducing only the laser oscillation lightwave $\Lambda q$ into the optical fiber 7. While the external feedback lightwave to the LD due to reflection is being suppressed, the light beam enters the filter at a slight angle with respect to the optical axis. Therefore, the natural emission lightwave can be stably filtered.

EXAMPLE 10

Figure 10:
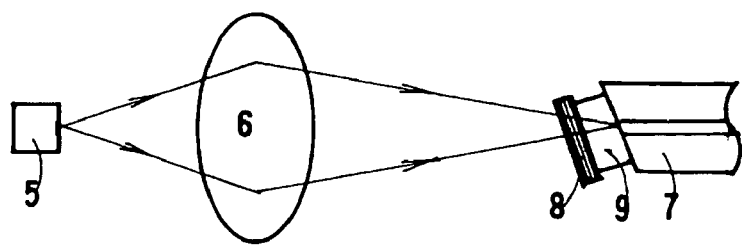
FIG. 10 is an optical system-constituting diagram of an optical module in Example 10 in which optical components are placed in series in the order of a semiconductor laser, a lens, and an optical fiber having an isolator and a natural emission lightwave-blocking filter both attached to its end face.

FIG. 10: LD+Lens+Optical Fiber with Filter and Isolator

FIG. 10 shows Example 10. This system also has an isolator. A semiconductor laser (LD) 5, a lens 6, and an optical fiber 7 are placed linearly in this order. A natural emission lightwave-blocking filter 8 and an isolator 9 are attached to the light-incoming face of the optical fiber 7. As with the foregoing example, the isolator 9 is provided to prevent the external feedback lightwave due to reflection. The natural emission lightwave-blocking filter 8 is placed in front of the optical fiber 7 to block the natural emission lightwave $\Sigma n$ included in the lightwave of the LD 5. Only the laser oscillation lightwave $\Lambda q$ is introduced into the optical fiber 7. This constitution can omit some attaching jigs such as a filter holder.

EXAMPLE 11

Figure 11:
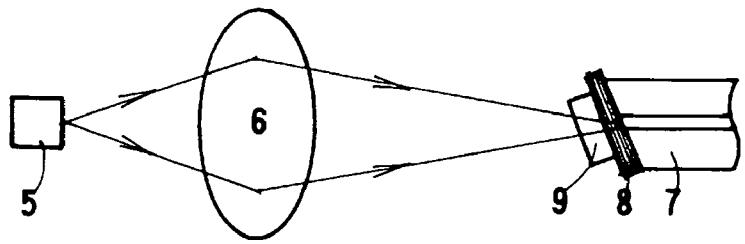
FIG. 11 is an optical system-constituting diagram of an optical module in Example 11 in which optical components are placed in series in the order of a semiconductor laser, a lens, and an optical fiber having a natural emission lightwave-blocking filter and an isolator both attached to its end face.

FIG. 11: LD+Lens+Optical Fiber with Isolator and Filter

FIG. 11 shows Example 11. This system also has an isolator. A semiconductor laser (LD) 5, a lens 6, and an optical fiber 7 are placed linearly in this order. An isolator 9 and a natural emission lightwave-blocking filter 8 are attached to the light-incoming face of the optical fiber 7. As with the foregoing example, the isolator 9 is provided to prevent the external feedback lightwave due to reflection. The natural emission lightwave-blocking filter 8 is placed in front of the optical fiber 7 to block the natural emission lightwave Σn included in the lightwave of the LD 5. Only the laser oscillation lightwave Λq is introduced into the optical fiber 7. This constitution can omit some attaching jigs such as a filter holder.

EXAMPLE 12

Figure 12:
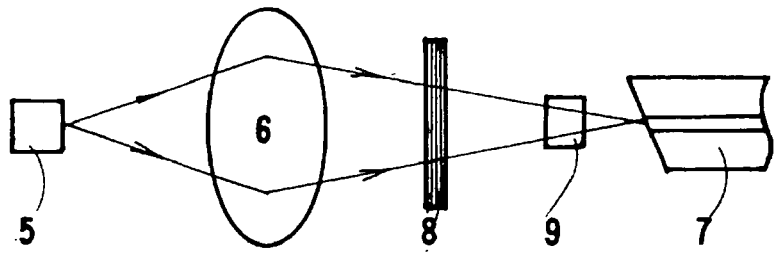
FIG. 12 is an optical system-constituting diagram of an optical module in Example 12 in which optical components are placed in series in the order of a semiconductor laser, a lens, a natural emission lightwave-blocking filter, an isolator, and an optical fiber.

FIG. 12: LD+Lens+Filter+Isolator+Optical Fiber

FIG. 12 shows Example 12. A lens 6, a natural emission lightwave-blocking filter 8, an isolator 9, and an optical fiber 7 are placed in this order on an extension of the optical axis of a semiconductor laser (LD) 5. The natural emission lightwave-blocking filter 8 is placed between the lens 6 and the isolator 9. The natural emission lightwave-blocking filter 8 is placed in front of the isolator 9 and the optical fiber 7 to block the natural emission lightwave Σn included in the lightwave of the LD 5. Only the laser oscillation lightwave Λq is introduced into the optical fiber 7.

EXAMPLE 13

Figure 13:
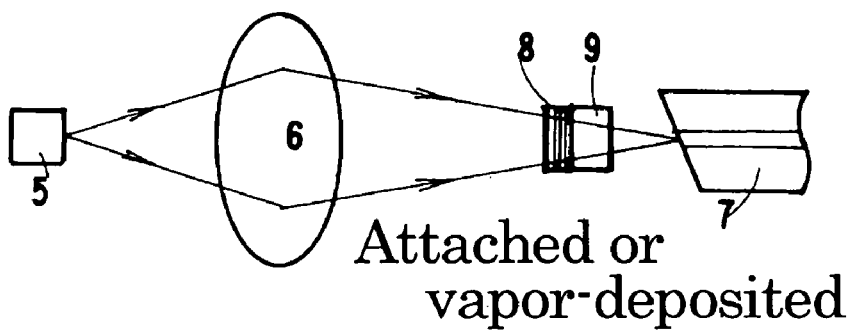
FIG. 13 is an optical system-constituting diagram of an optical module in Example 13 in which optical components are placed in series in the order of a semiconductor laser, a lens, an isolator having a natural emission lightwave-blocking filter attached to its light-incoming side, and an optical fiber.

FIG. 13: LD+Lens+Isolator with Filter+Optical Fiber

FIG. 13 shows Example 13. A lens 6, an isolator 9 with a natural emission lightwave-blocking filter 8, and an optical fiber 7 are placed in this order on an extension of the optical axis of a semiconductor laser (LD) 5. The natural emission lightwave-blocking filter 8 is attached to the front face of the isolator 9. The natural emission lightwave-blocking filter 8 blocks the natural emission lightwave Σn included in the lightwave of the LD 5. Only the laser oscillation lightwave Λq is introduced into the optical fiber 7. This constitution can omit some attaching jigs such as a filter holder.

EXAMPLE 14

Figure 14:
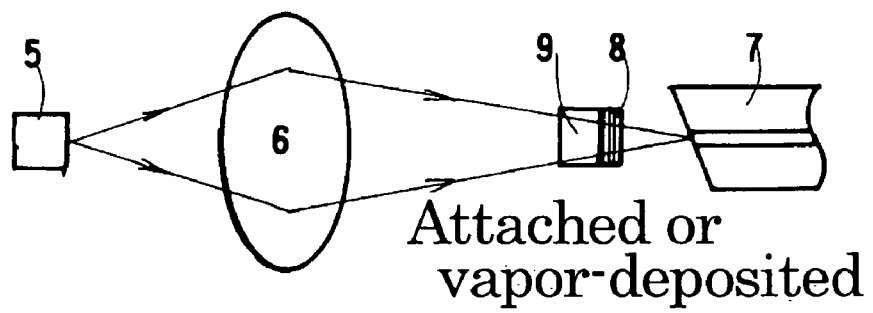
FIG. 14 is an optical system-constituting diagram of an optical module in Example 14 in which optical components are placed in series in the order of a semiconductor laser, a lens, an isolator having a natural emission lightwave-blocking filter attached to its light-outgoing side, and an optical fiber.

FIG. 14: LD+Lens+Isolator with Filter+Optical Fiber

FIG. 14 shows Example 14. A lens 6, an isolator 9 with a natural emission lightwave-blocking filter 8, and an optical fiber 7 are placed in this order on an extension of the optical axis of a semiconductor laser (LD) 5. The natural emission lightwave-blocking filter 8 is attached to the rear face of the isolator 9. The natural emission lightwave-blocking filter 8 blocks the natural emission lightwave Σn included in the lightwave of the LD 5. Only the laser oscillation lightwave Λq is introduced into the optical fiber 7. This constitution can omit some attaching jigs such as a filter holder.

EXAMPLE 15

Figure 15:
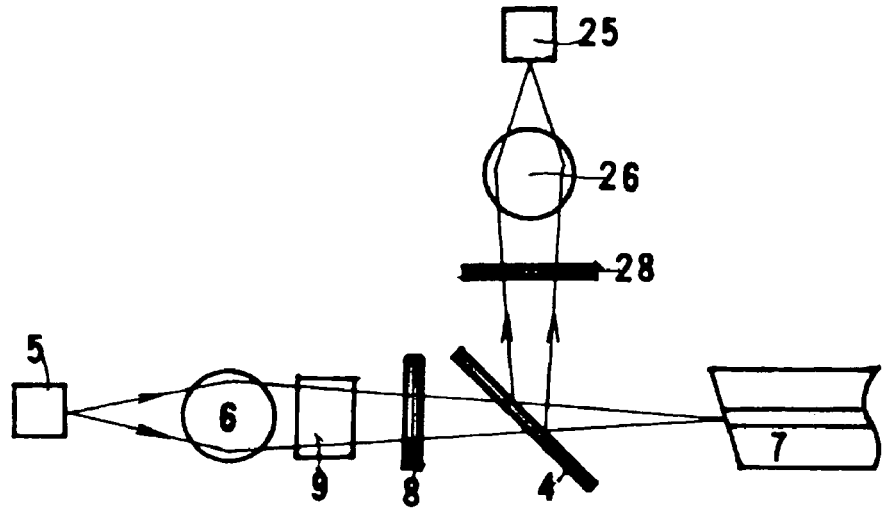
FIG. 15 is an optical system-constituting diagram of an optical module in Example 15 in which a semiconductor laser, a lens, an isolator, a natural emission lightwave-blocking filter, a wavelength-selecting filter, and an optical fiber are arranged in series and a noise wavelength-blocking filter, another lens, and a photodiode are placed at the reflection side of the wavelength-selecting filter so that an outgoing signal lightwave can enter the optical fiber and an incoming signal lightwave can enter the photodiode.

FIG. 15: LD+Lens+Isolator+Filter+Wavelength-selecting Filter +Lens+PD+Optical Fiber FIG. 15 shows Example 15. Examples 15 to 18 are examples in which the present invention is applied to a transmitter-receiver module (LD/PD) that sends signals bidirectionally over a single optical fiber. A lens 6, an isolator 9, a natural emission lightwave-blocking filter 8, a 45-degree-slanted wavelength-selecting filter 4, and an optical fiber 7 are placed in this order on an extension of the optical axis of a semiconductor laser (LD) 5. With respect to the wavelength-selecting filter 4, a PD 25 and a lens 26 are placed in a direction symmetrical to the LD 5 and the lens 6. A noise wavelength-blocking filter 28 is placed between the lens 26 and the wavelength-selecting filter 4. The incoming signal lightwave having travelled over the optical fiber 7 is reflected from the wavelength-selecting filter 4, bends its optical path 90 degrees, passes through the noise wavelength-blocking filter 28, is condensed by the lens 26, and enters the PD 25. In this constitution, the light beam enters the filter at a slight angle with respect to the optical axis, stabilizing the filter property. Consequently, a single-fiber transmitter-receiver module can be materialized that stably filters the natural emission lightwave.

The 45-degree-slanted wavelength-selecting filter 4 has a function of transmitting the outgoing signal lightwave of the LD 5 and reflecting the incoming signal lightwave. The filter can be made of a dielectric multilayer film. The noise wavelength-blocking filter 28 at the PD side transmits only the wavelength of the incoming signal lightwave. This filter is originally used in a wavelength division multiplexing transmitter-receiver module to take out only the receiving wavelength of the node. Even when such a system is produced, a natural emission lightwave of the same wavelength intrudes from another node. Therefore, the interference cannot be prevented only by the incorporation of the wavelength-selecting filter. This fact was the starting point of the present invention. In the case of the wavelength division multiplexing, the natural emission lightwave-blocking filter 8 blocks the natural emission lightwave Σn included in the lightwave of the LD 5. Only the laser oscillation lightwave Λq is introduced into the optical fiber 7.

In this example, the isolator can be omitted. In this constitution, the natural emission lightwave-blocking filter 8 is placed between the isolator 9 and the 45-degree-slanted wavelength-selecting filter 4. Nevertheless, the filter 8 may be placed between the isolator 9 and the lens 6. In addition, the natural emission lightwave-blocking filter 8 may be formed on a face of the 45-degree-slanted wavelength-selecting filter 4, the face being closer to the semiconductor laser (LD) 5.

EXAMPLE 16

Figure 16:
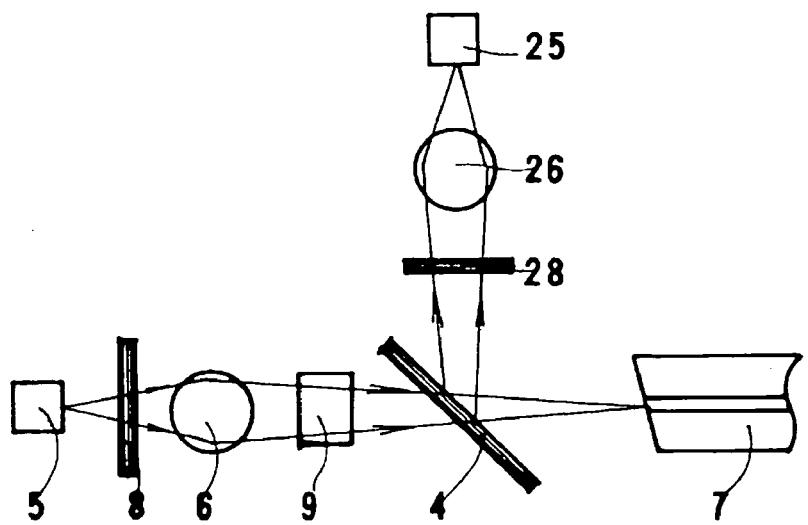
FIG. 16 is an optical system-constituting diagram of an optical module in Example 16 in which a semiconductor laser, a natural emission lightwave-blocking filter, a lens, an isolator, a wavelength-selecting filter, and an optical fiber are arranged in series and a noise wavelength-blocking filter, another lens, and a photodiode are placed at the reflection side of the wavelength-selecting filter so that an outgoing signal lightwave can enter the optical fiber and an incoming signal lightwave can enter the photodiode.

FIG. 16: LD+Filter+Lens+Isolator+Wavelength-selecting Filter +Lens+PD+Optical Fiber FIG. 16 shows Example 16. This also is an example in which the present invention is applied to a transmitter-receiver module (LD/PD) that sends signals bidirectionally over a single optical fiber. A natural emission lightwave-blocking filter 8, a lens 6, an isolator 9, a 45-degree-slanted wavelength-selecting filter 4, and an optical fiber 7 are placed in this order on an extension of the optical axis of a semiconductor laser (LD) 5. With respect to the wavelength-selecting filter 4, a noise wavelength-blocking filter 28, a PD 25, and a lens 26 are placed in a direction symmetrical to the LD 5 and the lens 6. The incoming signal lightwave having travelled over the optical fiber 7 is reflected from the wavelength-selecting filter 4, bends its optical path 90 degrees, passes through the noise wavelength-blocking filter 28, is condensed by the lens 26, and enters the PD 25. The noise wavelength-blocking filter 28 at the PD side transmits only the wavelength of the incoming signal lightwave. The natural emission lightwave-blocking filter 8 blocks the natural emission lightwave Σn included in the lightwave of the LD 5. Only the laser oscillation lightwave Λq is introduced into the optical fiber 7. In this constitution, the LD, the natural emission lightwave-blocking filter, and the lens can be hermetically sealed as a unitary body, enabling the miniaturization of the module. In this example, the isolator may be omitted. In addition, the natural emission lightwave-blocking filter 8 may be formed on a face of the lens 6.

EXAMPLE 17

Figure 17:
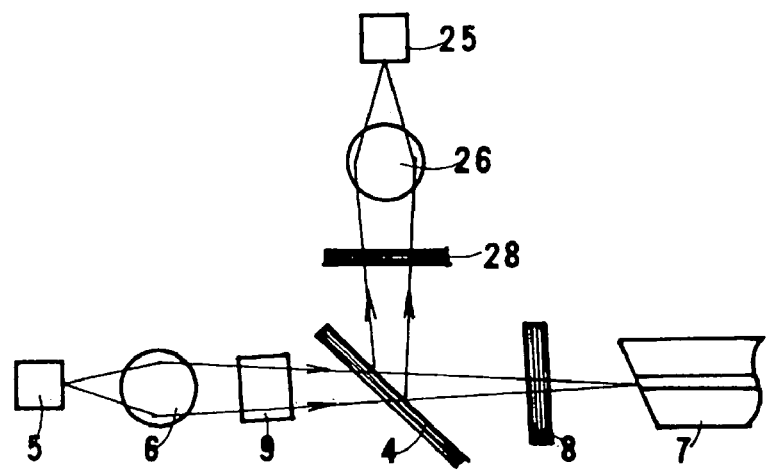
FIG. 17 is an optical system-constituting diagram of an optical module in Example 17 in which a semiconductor laser, a lens, an isolator, a wavelength-selecting filter, a natural emission lightwave-blocking filter, and an optical fiber are arranged in series and a noise wavelength-blocking filter, another lens, and a photodiode are placed at the reflection side of the wavelength-selecting filter so that an outgoing signal lightwave can enter the optical fiber and an incoming signal lightwave can enter the photodiode.

FIG. 17: LD+Lens+Isolator+Wavelength-selecting Filter+Lens+PD+Natural Emission Lightwave-blocking Filter+Optical Fiber FIG. 17 shows Example 17. This also is an example in which the present invention is applied to a transmitter-receiver module (LD/PD) that sends signals bidirectionally over a single optical fiber. A lens 6, an isolator 9, a 45-degree-slanted wavelength-selecting filter 4, a natural emission lightwave-blocking filter 8, and an optical fiber 7 are placed in this order on an extension of the optical axis of a semiconductor laser (LD) 5. With respect to the wavelength-selecting filter 4, a noise wavelength-blocking filter 28, a PD 25, and a lens 26 are placed in a direction symmetrical to the LD 5 and the lens 6. In this example, the natural emission lightwave-blocking filter 8 is designed to be capable of transmitting both the laser oscillation lightwave Λq of the semiconductor laser and the incoming signal lightwave. The incoming signal lightwave having travelled over the optical fiber 7 is reflected from the wavelength-selecting filter 4, bends its optical path 90 degrees, passes through the noise wavelength-blocking filter 28, is condensed by the lens 26, and enters the PD 25. The natural emission lightwave-blocking filter 8 blocks the natural emission lightwave Σn included in the lightwave of the LD 5. Only the laser oscillation lightwave Λq is introduced into the optical fiber 7. In this example, the isolator can also be omitted. In this constitution, the light beam enters the filter at a slight angle with respect to the optical axis, stabilizing the filter property. Consequently, a single-fiber transmitter-receiver module can be materialized that stably filters the natural emission lightwave. In addition, the natural emission lightwave-blocking filter 8 may be placed so as to be slanted against, not perpendicular to, the optical axis connecting the LD 5 and the optical fiber 7.

EXAMPLES 18 AND 19

Figure 18:
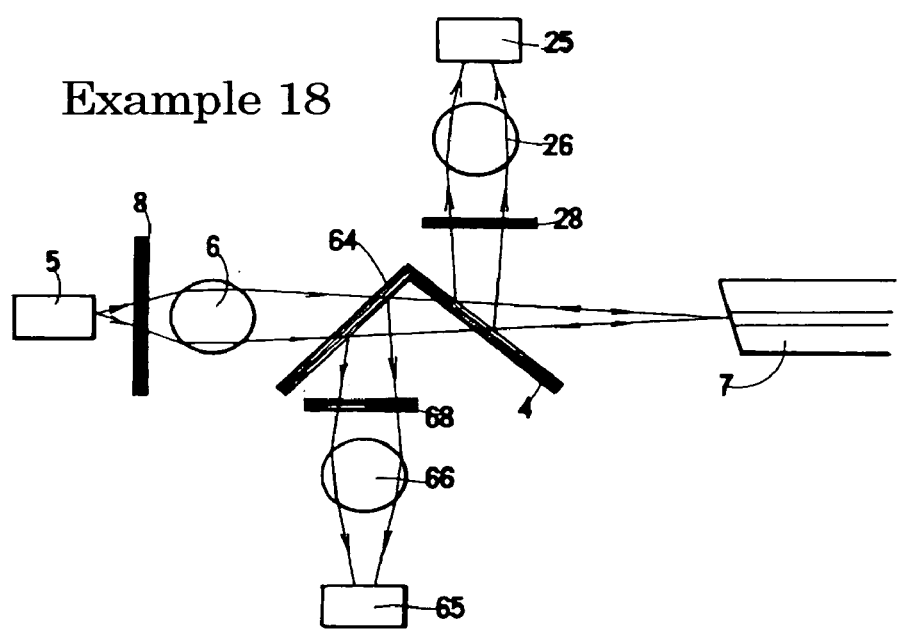
FIG. 18 is an optical system-constituting diagram of an optical module in Example 18 in which a semiconductor laser, a natural emission lightwave-blocking filter, a lens, a 45-degree-slanted wavelength-selecting filter, an inversely 45-degree-slanted wavelength-selecting filter, and an optical fiber are arranged in series and two combinations of a noise wavelength-blocking filter, a lens, and a photodiode are placed at the reflection side of the two wavelength-selecting filters so that an outgoing signal lightwave can enter the optical fiber and two types of incoming signal lightwaves can enter the photodiodes.
Figure 29:
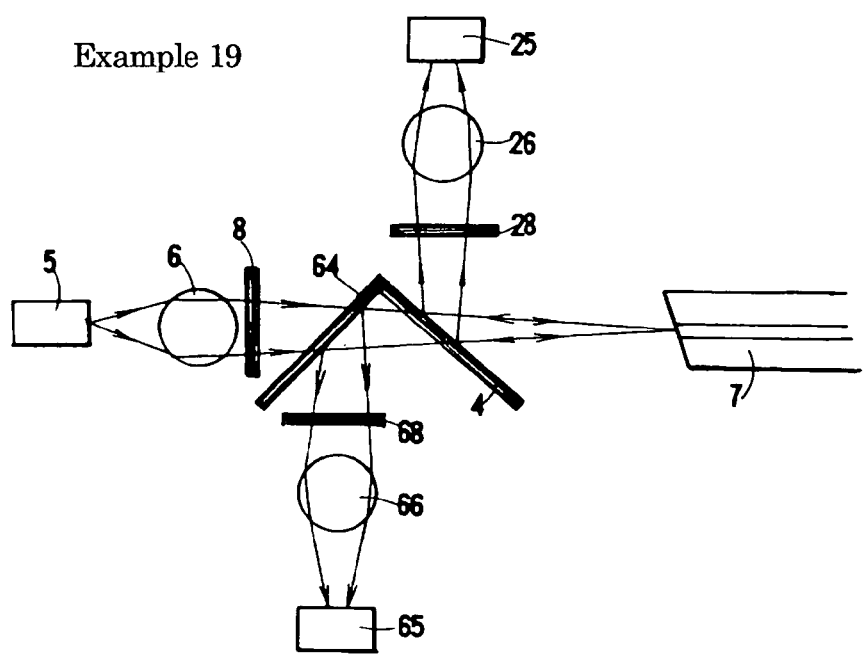
FIG. 29 is an optical system-constituting diagram of an optical module in Example 19 in which a semiconductor laser, a lens, a natural emission lightwave-blocking filter, a 45-degree-slanted wavelength-selecting filter, an inversely 45-degree-slanted wavelength-selecting filter, and an optical fiber are arranged in series and two combinations of a noise wavelength-blocking filter, a lens, and a photodiode are placed at the reflection side of the two wavelength-selecting filters so that an outgoing signal lightwave can enter the optical fiber and two types of incoming signal lightwaves can enter the photodiodes.

FIGS. 18 and 29: LD+Natural Emission Lightwave-blocking Filter+Lens+Wavelength-selecting Filter+Wavelength-selecting Filter+PD+Lens+Filter+PD+Lens+Filter+Optical Fiber FIG. 18 shows Example 18. This is a three-port-type module using two PDs and one LD. A natural emission lightwave-blocking filter 8, a lens 6, a 45-degree-slanted wavelength-selecting filter 64, an inversely 45-degree-slanted wavelength-selecting filter 4, and an optical fiber 7 are placed in this order on an extension of the optical axis of a semiconductor laser (LD) 5. With respect to the wavelength-selecting filter 4, a PD 25, a lens 26, and a noise wavelength-blocking filter 28 are placed in a direction symmetrical to the LD 5 and the lens 6. Similarly, with respect to the wavelength-selecting filter 64, a PD 65, a lens 66, and a noise wavelength-blocking filter 68 are placed in a direction symmetrical to the LD 5 and the lens 6. An incoming signal lightwave of some wavelength having travelled over the optical fiber 7 is reflected from the wavelength-selecting filter 4, passes through the noise wavelength-blocking filter 28, is condensed by the lens 26, and enters the PD 25. Another incoming signal lightwave of another wavelength having travelled over the optical fiber 7 is reflected from the wavelength-selecting filter 64, passes through the noise wavelength-blocking filter 68, is condensed by the lens 66, and enters the PD 65. The lightwave of the LD 5 passes through the natural emission lightwave-blocking filter 8, which blocks the natural emission lightwave, is condensed by the lens 6, passes through the 45-degree-slanted wavelength-selecting filter 64 and the inversely 45-degree-slanted wavelength-selecting filter 4, and enters the optical fiber 7. The natural emission lightwave-blocking filter 8 blocks the natural emission lightwave Σn included in the lightwave of the LD 5. Only the laser oscillation lightwave Λq is introduced into the optical fiber 7.

In this constitution, the LD, the natural emission lightwave-blocking filter, and the lens can be hermetically sealed as a unitary body, enabling the miniaturization of the module.

The natural emission lightwave-blocking filter 8 may be placed between the lens 6 and the wavelength-selecting filter 64 (see FIG. 29: Example 19). In this constitution, the light beam enters the filter at a slight angle with respect to the optical axis, stabilizing the filter property.

In addition, the natural emission lightwave-blocking filter 8 may be placed so as to be slanted against, not perpendicular to, the optical axis connecting the LD 5 and the optical fiber 7.

EXAMPLE 20

Figure 30:
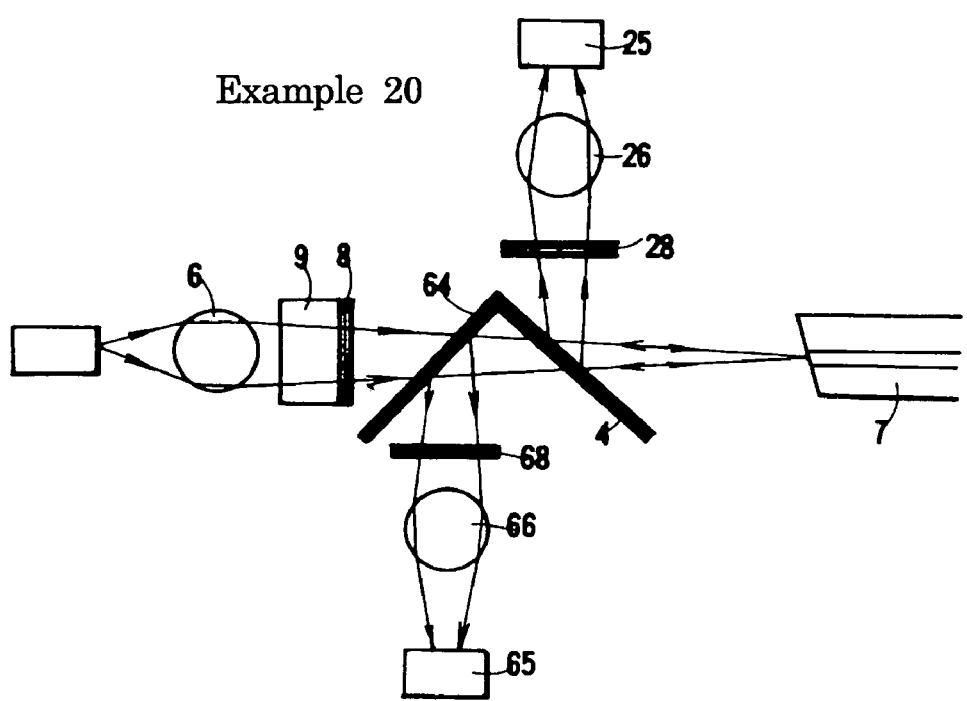
FIG. 30 is an optical system-constituting diagram of an optical module in Example 20 in which a semiconductor laser, a lens, an isolator with a natural emission lightwave-blocking filter, a 45-degree-slanted wavelength-selecting filter, an inversely 45-degree-slanted wavelength-selecting filter, and an optical fiber are arranged in series and two combinations of a noise wavelength-blocking filter, a lens, and a photodiode are placed at the reflection side of the two wavelength-selecting filters so that an outgoing signal lightwave can enter the optical fiber and two types of incoming signal lightwaves can enter the photodiodes.

FIG. 30: LD+Lens+Natural Emission Lightwave-blocking Filter+Isolator+Wavelength-selecting Filter+Wavelength-selecting Filter+PD+Lens +Filter+PD+Lens+Filter+Optical Fiber FIG. 30 shows Example 20. This is also a three-port-type module using two PDs and one LD. A lens 6, an isolator 9 having a natural emission lightwave-blocking filter 8 attached to it, a 45-degree-slanted wavelength-selecting filter 64, an inversely 45-degree-slanted wavelength-selecting filter 4, and an optical fiber 7 are placed in this order on an extension of the optical axis of a semiconductor laser (LD) 5. With respect to the wavelength-selecting filter 4, a PD 25, a lens 26, and a noise wavelength-blocking filter 28 are placed in a direction symmetrical to the LD 5 and the lens 6. Similarly, with respect to the wavelength-selecting filter 64, a PD 65, a lens 66, and a noise wavelength-blocking filter 68 are placed in a direction symmetrical to the LD 5 and the lens 6. An incoming signal lightwave of some wavelength having travelled over the optical fiber 7 is reflected from the wavelength-selecting filter 4, passes through the noise wavelength-blocking filter 28, is condensed by the lens 26, and enters the PD 25. Another incoming signal lightwave of another wavelength having travelled over the optical fiber 7 is reflected from the wavelength-selecting filter 64, passes through the noise wavelength-blocking filter 68, is condensed by the lens 66, and enters the PD 65. The lightwave of the LD 5 is condensed by the lens 6, and its natural emission lightwave is blocked by the natural emission lightwave-blocking filter 8. The LD 5's lightwave passes through the isolator 9, the 45-degree-slanted wavelength-selecting filter 64, and the inversely 45-degree-slanted wavelength-selecting filter 4 and enters the optical fiber 7. The natural emission lightwave-blocking filter 8 blocks the natural emission lightwave Σn included in the lightwave of the LD 5. Only the laser oscillation lightwave Λq is introduced into the optical fiber 7.

Because the natural emission lightwave-blocking filter 8 is attached to the isolator 9, some attaching jigs such as a filter holder can be omitted.

In all of Examples 1 to 20 described above, the optical module has an optical fiber as a component. Nevertheless, the optical module may have as a component, in place of the optical fiber, a connector to which an optical fiber can be connected.

What is claimed is:

1. An optical module, comprising:
   (a) a semiconductor laser that emits a laser oscillation lightwave having a single wavelenth of Λq and a natural emission lightwave Σn;
   (b) an optical fiber for guiding the lightwave of the semiconductor laser;
   (c) a lens for condensing the lightwave of the semiconductor laser at the optical fiber; and
   (d) a natural emission lightwave-blocking filter that:
   (d1) is placed between the semiconductor laser and the optical fiber; and
   (d2) transmits the laser oscillation lightwave Λq of the semiconductor laser and blocks the natural emission lightwave Σn.

2. An optical module, comprising:
   (a) a semiconductor laser that emits a laser oscillation lightwave having a single wavelength of Λq and a natural emission lightwave Σn;
   (b) a connector to which an optical fiber for guiding the lightwave of the semiconductor laser can be connected;
   (c) a lens for condensing the lightwave of the semiconductor laser at the optical fiber connected to the connector; and
   (d) a natural emission lightwave-blocking filter that:
   (d1) is placed between the semiconductor laser and the connector to which an optical fiber can be connected; and
   (d2) transmits the laser oscillation lightwave Λq of the semiconductor laser and blocks the natural emission lightwave Σn.

3. An optical module as defined by claim 1, wherein the natural emission lightwave-blocking filter is placed between the lens and the optical fiber.

4. An optical module as defined by claim 2, wherein the natural emission lightwave-blocking filter is placed between the lens and the connector.

5. An optical module as defined by claim 1, wherein the natural emission lightwave-blocking filter is placed between the semiconductor laser and the lens.

6. An optical module as defined by claim 2, wherein the natural emission lightwave-blocking filter is placed between the semiconductor laser and the lens.

7. An optical module as defined by claim 3, wherein the natural emission lightwave-blocking filter is placed so as to be slanted against, not perpendicular to, the optical axis connecting the semiconductor laser (LD) and the optical fiber.

8. An optical module as defined by claim 4, wherein the natural emission lightwave-blocking filter is placed so as to be slanted against, not perpendicular to, the optical axis connecting the semiconductor laser (LD) and the connector.

9. An optical module as defined by claim 5, wherein the natural emission, lightwave-blocking filter is placed so as to be slanted against, not perpendicular to, the optical axis connecting the semiconductor laser (LD) and the optical fiber.

10. An optical module as defined by claim 6, wherein the natural emission lightwave-blocking filter is placed so as to be slanted against, not perpendicular to, the optical axis connecting the semiconductor laser (LD) and the connector.

11. An optical module as defined by claim 1, wherein the natural emission lightwave-blocking filter is attached to a face of the lens.

12. An optical module as defined by claim 2, wherein the natural emission lightwave-blocking filter is attached to a face of the lens.

13. An optical module, comprising:
    (a) a semiconductor laser for emitting an outgoing signal lightwave having a single wavelength;
    (b) a signal-transmitting lens for condensing the lightwave of the semiconductor laser at an optical fiber; and
    (c) a photodiode for receiving an incoming signal lightwave;
    (d) a signal-receiving lens for condensing the incoming signal lightwave at the photodiode;
    (e) a wavelength-selecting filter for separating a signal lightwave according to the wavelength, the filter being placed on the optical path of the outgoing signal lightwave;
    (f) a noise wavelength-blocking filter placed on the optical path of the incoming signal lightwave;
    (g) a connector to which an optical fiber for guiding the lightwave of the semiconductor laser can be connected; and
    (h) a natural emission lightwave-blocking filter for transmitting a laser oscillation lightwave and blocking a natural emission lightwave, the natural emission lightwave-blocking filter being placed between the semiconductor laser and the connector.

14. An optical module, comprising:
    (a) a semiconductor laser for emitting an outgoing signal lightwave having a single wavelength;
    (b) a signal-transmitting lens for condensing the lightwave of the semiconductor laser at an optical fiber; and
    (c) a photodiode for receiving an incoming signal lightwave;
    (d) a signal-receiving lens for condensing the incoming signal lightwave at the photodiode;
    (e) a wavelength-selecting filter for separating a signal lightwave according to the wavelength, the filter being placed on the optical path of the outgoing signal lightwave;
    (f) a noise wavelength-blocking filter placed on the optical path of the incoming signal lightwave;
    (g) an optical fiber for guiding the lightwave of the semiconductor laser; and
    (h) a natural emission lightwave-blocking filter for transmitting a laser oscillation lightwave and blocking a natural emission lightwave, the natural emission lightwave-blocking filter being placed between the semiconductor laser and the fiber.

15. An optical module as defined by claim 13, the optical module further comprising:
    (a) at least one of the photodiode;
    (b) at least one of the signal-receiving lens;
    (c) at least one of the wavelength-selecting filter placed on the optical path of the outgoing signal lightwave; and
    (d) at least one of the noise wavelength-blocking filter placed on the optical path of the incoming signal lightwave.

16. An optical module as defined by claim 14, the optical module further comprising:
    (a) at least one of the photodiode;
    (b) at least one of the signal-receiving lens;
    (c) at least one of the wavelength-selecting filter placed on the optical path of the outgoing signal lightwave; and (d) at least one of the noise wavelength-blocking filter placed on the optical path of the incoming signal lightwave.

17. An optical module as defined by claim 13, wherein the natural emission lightwave-blocking filter is placed between the signal-transmitting lens and the wavelength-selecting filter placed on the optical path of the outgoing signal lightwave.

18. An optical module as defined by claim 14, wherein the natural emission lightwave-blocking filter is placed between the signal-transmitting lens and the wavelength-selecting filter placed on the optical path of the outgoing signal lightwave.

19. An optical module as defined by claim 13, wherein the natural emission lightwave-blocking filter is placed so as to be slanted against, not perpendicular to, the optical axis connecting the semiconductor laser, the wavelength-selecting filter placed on the optical path of the outgoing signal lightwave, and the connector.

20. An optical module as defined by claim 14, wherein the natural emission lightwave-blocking filter is placed so as to be slanted against, not perpendicular to, the optical axis connecting the semiconductor laser, the wavelength-selecting filter placed on the optical path of the outgoing signal lightwave, and the optical fiber.

21. An optical module as defined by claim 13, wherein the natural emission lightwave-blocking filter is formed on a face of the wavelength-selecting filter placed on the optical path of the outgoing signal lightwave, the face being closer to the semiconductor laser.

22. An optical module as defined by claim 14, wherein the natural emission lightwave-blocking filter is formed on a face of the wavelength-selecting filter placed on the optical path of the outgoing signal lightwave, the face being closer to the semiconductor laser.

23. An optical module as defined by claim 13, wherein the natural emission lightwave-blocking filter is formed on a face of the signal-transmitting lens.

24. An optical module as defined by claim 14, wherein the natural emission lightwave-blocking filter is formed on a face of the signal-transmitting lens.

* * * * *